(12) United States Patent
Fishman et al.

(10) Patent No.: US 10,129,600 B2
(45) Date of Patent: Nov. 13, 2018

(54) SYSTEMS AND METHODS OF DISPLAYING CONTENT

(71) Applicant: OpenTV, Inc., San Francisco, CA (US)

(72) Inventors: Alex Fishman, San Francisco, CA (US); Isaac Chellin, San Francisco, CA (US); Jonathan Fong, Hayward, CA (US); Crx Chai, Oakland, CA (US)

(73) Assignee: OPENTV, INC., San Francisco, CA (US)

( * ) Notice: Subject to any disclaimer, the term of this patent is extended or adjusted under 35 U.S.C. 154(b) by 0 days.

(21) Appl. No.: 15/841,904

(22) Filed: Dec. 14, 2017

(65) Prior Publication Data

US 2018/0234736 A1 Aug. 16, 2018

Related U.S. Application Data

(63) Continuation of application No. 14/336,758, filed on Jul. 21, 2014, which is a continuation-in-part of application No. 14/242,459, filed on Apr. 1, 2014.

(Continued)

(51) Int. Cl.
*G06F 3/00* (2006.01)
*G06F 13/00* (2006.01)
(Continued)

(52) U.S. Cl.
CPC ....... *H04N 21/4821* (2013.01); *G06F 3/0482* (2013.01); *G06F 3/04817* (2013.01); *H04N 21/4312* (2013.01); *H04N 21/4314* (2013.01); *H04N 21/4532* (2013.01); *H04N 21/47202* (2013.01); *H04N 21/47205* (2013.01)

(58) Field of Classification Search
CPC combination set(s) only.
See application file for complete search history.

(56) References Cited

U.S. PATENT DOCUMENTS

| 5,798,785 A | 8/1998 | Hendricks et al. |
| 5,812,123 A * | 9/1998 | Rowe .................... G06F 3/0482 |
| | | 348/E5.105 |

(Continued)

FOREIGN PATENT DOCUMENTS

| AU | 201101152 | 10/2011 |
| CN | 106462316 A | 2/2017 |

(Continued)

OTHER PUBLICATIONS

"U.S. Appl. No. 12/877,034, Appeal Brief filed Jun. 11, 2015", 21 pgs.

(Continued)

*Primary Examiner* — Alexander Gee
(74) *Attorney, Agent, or Firm* — Schwegman Lundberg & Woessner, P.A.

(57) ABSTRACT

A device for enabling content selection is configured to display one or more sub-categories of content included within a category of content. The one or more sub-categories of content may be displayed using stack structures. The stack structures may include a plurality of icons representing available content. The stack structures may enable thumbnail browsing of content available from a plurality of diverse sources. The device may enable a user to cycle through sub-category types.

20 Claims, 15 Drawing Sheets

Related U.S. Application Data

(60) Provisional application No. 61/876,188, filed on Sep. 10, 2013, provisional application No. 61/876,199, filed on Sep. 10, 2013.

(51) Int. Cl.
*H04N 5/445* (2011.01)
*H04N 21/482* (2011.01)
*H04N 21/472* (2011.01)
*H04N 21/45* (2011.01)
*H04N 21/431* (2011.01)
*G06F 3/0482* (2013.01)
*G06F 3/0481* (2013.01)

(56) References Cited

U.S. PATENT DOCUMENTS

| | | | |
|---|---|---|---|
| 6,804,675 B1 | 10/2004 | Knight et al. |
| 7,353,235 B2 | 4/2008 | Sally et al. |
| 7,739,604 B1 | 6/2010 | Lyons et al. |
| 7,801,419 B2 | 9/2010 | Sakai et al. |
| 8,108,341 B2 | 1/2012 | Barsook et al. |
| 8,230,360 B2 | 7/2012 | Ma et al. |
| 8,286,206 B1 | 10/2012 | Aaron et al. |
| 8,402,031 B2 | 3/2013 | Govani et al. |
| 8,429,530 B2 | 4/2013 | Neuman et al. |
| 8,677,235 B2 | 3/2014 | Chronister et al. |
| 8,803,882 B2 | 8/2014 | Lam et al. |
| 9,009,768 B2 | 4/2015 | Agnihotri et al. |
| 9,135,333 B2 | 9/2015 | Cameron et al. |
| 9,595,300 B2 | 3/2017 | Duffin et al. |
| 9,678,623 B2 | 6/2017 | Neuman et al. |
| 9,699,503 B2 | 7/2017 | Fishman et al. |
| 9,883,250 B2 | 1/2018 | Chai et al. |
| 2002/0011988 A1 | 1/2002 | Sai et al. |
| 2002/0053084 A1 | 5/2002 | Escobar et al. |
| 2002/0059593 A1 | 5/2002 | Shao et al. |
| 2002/0112239 A1 | 8/2002 | Goldman |
| 2003/0037334 A1 | 2/2003 | Khoo et al. |
| 2003/0093790 A1 | 5/2003 | Logan et al. |
| 2003/0172374 A1 | 9/2003 | Vinson et al. |
| 2003/0217365 A1 | 11/2003 | Caputo |
| 2003/0236695 A1 | 12/2003 | Litwin, Jr. |
| 2004/0056900 A1 | 3/2004 | Blume |
| 2006/0123448 A1 | 6/2006 | Ma et al. |
| 2006/0242554 A1 | 10/2006 | Gerace et al. |
| 2006/0277098 A1 | 12/2006 | Chung et al. |
| 2007/0011702 A1 | 1/2007 | Vaysman |
| 2007/0061745 A1 | 3/2007 | Anthony et al. |
| 2007/0100824 A1 | 5/2007 | Richardson et al. |
| 2007/0136753 A1 | 6/2007 | Bovenschulte et al. |
| 2007/0157248 A1 | 7/2007 | Ellis |
| 2007/0192794 A1* | 8/2007 | Curtis ............ G06F 3/04817 725/42 |
| 2007/0220543 A1 | 9/2007 | Shanks et al. |
| 2007/0240180 A1 | 10/2007 | Shanks et al. |
| 2008/0117202 A1 | 5/2008 | Martinez et al. |
| 2008/0134053 A1 | 6/2008 | Fischer |
| 2008/0155588 A1 | 6/2008 | Roberts et al. |
| 2008/0222106 A1 | 9/2008 | Rao et al. |
| 2009/0031354 A1 | 1/2009 | Riley et al. |
| 2009/0060469 A1 | 3/2009 | Olague et al. |
| 2009/0083326 A1 | 3/2009 | Pelton |
| 2009/0100469 A1 | 4/2009 | Conradt et al. |
| 2009/0144773 A1 | 6/2009 | Cavanaugh et al. |
| 2009/0150786 A1 | 6/2009 | Brown |
| 2009/0163183 A1 | 6/2009 | O'donoghue et al. |
| 2009/0164450 A1 | 6/2009 | Martinez et al. |
| 2009/0249393 A1 | 10/2009 | Shelton et al. |
| 2009/0265359 A1 | 10/2009 | Barsook et al. |
| 2010/0058241 A1 | 3/2010 | Saijo et al. |
| 2010/0071000 A1 | 3/2010 | Amento et al. |
| 2010/0201618 A1 | 8/2010 | Lorente |
| 2010/0235745 A1* | 9/2010 | Shintani ............ H04N 5/44513 715/719 |
| 2010/0293034 A1 | 11/2010 | Olejniczak et al. |
| 2011/0035707 A1 | 2/2011 | Kitayama |
| 2011/0060649 A1 | 3/2011 | Dunk et al. |
| 2011/0175867 A1 | 7/2011 | Satake |
| 2011/0283189 A1 | 11/2011 | Mccarty |
| 2011/0283304 A1 | 11/2011 | Roberts et al. |
| 2011/0289189 A1 | 11/2011 | Bartholomew |
| 2011/0289422 A1 | 11/2011 | Spivack et al. |
| 2011/0320715 A1 | 12/2011 | Ickman et al. |
| 2012/0059825 A1 | 3/2012 | Fishman et al. |
| 2012/0060094 A1 | 3/2012 | Irwin et al. |
| 2012/0060195 A1 | 3/2012 | Fishman et al. |
| 2012/0124625 A1 | 5/2012 | Foote et al. |
| 2012/0311453 A1 | 12/2012 | Reyna et al. |
| 2013/0066885 A1 | 3/2013 | Komuves |
| 2013/0073988 A1 | 3/2013 | Groten et al. |
| 2013/0086159 A1 | 4/2013 | Gharachorloo et al. |
| 2013/0152129 A1 | 6/2013 | Alberth et al. |
| 2013/0191401 A1 | 7/2013 | Xia et al. |
| 2013/0204825 A1 | 8/2013 | Su |
| 2013/0212493 A1 | 8/2013 | Krishnamurthy |
| 2014/0052785 A1 | 2/2014 | Sirpal |
| 2014/0068689 A1 | 3/2014 | Sirpal et al. |
| 2014/0365873 A1 | 12/2014 | Willis et al. |
| 2015/0006280 A1 | 1/2015 | Ruiz et al. |
| 2015/0074552 A1 | 3/2015 | Chai et al. |
| 2015/0074721 A1 | 3/2015 | Fishman et al. |
| 2015/0074728 A1 | 3/2015 | Chai et al. |
| 2015/0206269 A1 | 7/2015 | Qin |
| 2018/0020255 A1 | 1/2018 | Fishman et al. |
| 2018/0035161 A1 | 2/2018 | Fishman et al. |

FOREIGN PATENT DOCUMENTS

| | | |
|---|---|---|
| EP | 2490454 A2 | 8/2012 |
| JP | 2001145087 A | 5/2001 |
| JP | 2002521929 A | 7/2002 |
| JP | 2004023118 A | 1/2004 |
| JP | 2007516496 A | 6/2007 |
| JP | 2008152584 A | 7/2008 |
| JP | 2008527539 A | 7/2008 |
| JP | 2008276705 A | 11/2008 |
| JP | 2009122981 A | 6/2009 |
| JP | 2009266238 A | 11/2009 |
| JP | 2010506299 A | 2/2010 |
| JP | 2011070316 A | 4/2011 |
| JP | 2011097400 A | 5/2011 |
| JP | 2011234198 A | 11/2011 |
| JP | 2012038292 A | 2/2012 |
| JP | 2012065265 A | 3/2012 |
| JP | 2013012954 A | 1/2013 |
| JP | 2013080507 A | 5/2013 |
| JP | 2013135466 A | 7/2013 |
| KR | 1020120094690 A | 8/2012 |
| WO | WO-2008050613 A1 | 5/2008 |
| WO | WO-2012033489 A1 | 3/2012 |
| WO | WO-2015038515 A1 | 3/2015 |
| WO | WO-2015038516 A1 | 3/2015 |

OTHER PUBLICATIONS

"U.S. Appl. No. 12/877,034, Appeal Decision mailed Jan. 3, 2017", 10 pgs.

"U.S. Appl. No. 12/877,034, Decision on Pre-Appeal Brief Request mailed Dec. 11, 2014", 2 pgs.

"U.S. Appl. No. 12/877,034, Examiner Interview Summary dated Jul. 24, 2013", 3 pgs.

"U.S. Appl. No. 12/877,034, Final Office Action dated Mar. 25, 2013", 14 pgs.

"U.S. Appl. No. 12/877,034, Final Office Action dated Jun. 13, 2014", 14 pgs.

"U.S. Appl. No. 12/877,034, Non Final Office Action dated Aug. 10, 2012", 11 pgs.

"U.S. Appl. No. 12/877,034, Non Final Office Action dated Oct. 1, 2013", 13 pgs.

"U.S. Appl. No. 12/877,034, Notice of Allowance dated Mar. 29, 2017", 9 pgs.

(56) References Cited

OTHER PUBLICATIONS

"U.S. Appl. No. 12/877,034, Pre-Appeal Brief Request filed Nov. 4, 2014", 5 pgs.
"U.S. Appl. No. 12/877,034, Response filed Feb. 26, 2014 to Non Final Office Action dated Oct. 1, 2013", 13 lpgs.
"U.S. Appl. No. 12/877,034, Response filed Aug. 26, 2013 to Final Office Action dated Mar. 25, 2013", 12 pgs.
"U.S. Appl. No. 12/877,034, Response filed Nov. 13, 2012 to Non Final Office Action dated Aug. 10, 2012", 11 pgs.
"U.S. Appl. No. 12/877,993, Amendment with Request to Reopen Prosecution filed Jun. 7, 2017", 18 pgs.
"U.S. Appl. No. 12/877,993, Appeal Brief filed Feb. 24, 2016", 20 pgs.
"U.S. Appl. No. 12/877,993, Appeal Decision mailed May 8, 2017", 9 pgs.
"U.S. Appl. No. 12/877,993, Examiner Interview Summary dated Mar. 19, 2018", 3 pgs.
"U.S. Appl. No. 12/877,993, Final Office Action dated Jan. 28, 2015", 35 pgs.
"U.S. Appl. No. 12/877,993, Final Office Action dated Mar. 15, 2013", 30 pgs.
"U.S. Appl. No. 12/877,993, Non Final Office Action dated Jun. 20, 2014", 31 pgs.
"U.S. Appl. No. 12/877,993, Non Final Office Action dated Aug. 2, 2012", 26 pgs.
"U.S. Appl. No. 12/877,993, Non Final Office Action dated Dec. 15, 2017", 36 pgs.
"U.S. Appl. No. 12/877,993, Response filed Mar. 15, 2018 to Non Final Office Action dated Dec. 15, 2017", 25 pgs.
"U.S. Appl. No. 12/877,993, Response filed Jul. 22, 2013 to Final Office Action dated Mar. 15, 2013", 17 pgs.
"U.S. Appl. No. 12/877,993, Response filed Oct. 14, 2014 to Non Final Office Action dated Jun. 20, 2014", 19 pgs.
"U.S. Appl. No. 12/877,993, Response filed Dec. 3, 2012 to Non Final Office Action dated Aug. 2, 2012", 17 pgs.
"U.S. Appl. No. 12/878,001, Appeal Brief filed May 12, 2015", 16 pgs.
"U.S. Appl. No. 12/878,001, Appeal Decision mailed Mar. 20, 2017", 10 pgs.
"U.S. Appl. No. 12/878,001, Examiner Interview Summary dated Jul. 24, 2013", 3 pgs.
"U.S. Appl. No. 12/878,001, Examiner Interview Summary dated Dec. 18, 2017", 3 pgs.
"U.S. Appl. No. 12/878,001, Final Office Action dated Mar. 29, 2013", 13 pgs.
"U.S. Appl. No. 12/878,001, Final Office Action dated Jul. 17, 2014", 12 pgs.
"U.S. Appl. No. 12/878,001, Non Final Office Action dated Aug. 9, 2012", 11 pgs.
"U.S. Appl. No. 12/878,001, Non Final Office Action dated Aug. 24, 2017", 14 pgs.
"U.S. Appl. No. 12/878,001, Non Final Office Action dated Oct. 3, 2013", 12 pgs.
"U.S. Appl. No. 12/878,001, Request to Reopen Prosecution under 37 C.F.R. § 41.50 filed May 19, 2017", 8 pgs.
"U.S. Appl. No. 12/878,001, Response filed Apr. 1, 2014 to Non Final Office Action dated Oct. 3, 2013", 13 pgs.
"U.S. Appl. No. 12/878,001, Response filed Aug. 23, 2013 to Final Office Action dated Mar. 29, 2013", 12 pgs.
"U.S. Appl. No. 12/878,001, Response filed Nov. 9, 2012 to Non Final Office Action dated Aug. 9, 2012", 11 pgs.
"U.S. Appl. No. 12/878,001, Response filed Dec. 22, 2017 to Non Final Office Action dated Aug. 24, 2017", 16 pgs.
"U.S. Appl. No. 14/242,459, Advisory Action dated Sep. 2, 2015", 6 pgs.
"U.S. Appl. No. 14/242,459, Appeal Brief filed Dec. 4, 2015", 17 pgs.
"U.S. Appl. No. 14/242,459, Applicant's Summary of Examiner Interview filed Sep. 15, 2015", 2 pgs.
"U.S. Appl. No. 14/242,459, Applicant's Summary of Examiner Interview filed Nov. 17, 2015", 4 pgs.
"U.S. Appl. No. 14/242,459, Decision on Pre-Appeal Brief Request dated Nov. 4, 2015", 4 pgs.
"U.S. Appl. No. 14/242,459, Examiner Interview Summary dated Mar. 3, 2015", 3 pgs.
"U.S. Appl. No. 14/242,459, Examiner Interview Summary dated Jul. 21, 2015", 3 pgs.
"U.S. Appl. No. 14/242,459, Examiner Interview Summary dated Nov. 17, 2015", 3 pgs.
"U.S. Appl. No. 14/242,459, Examiner's Answer to Appeal Brief dated Jul. 12, 2016", 18 pgs.
"U.S. Appl. No. 14/242,459, Final Office Action dated Jun. 19, 2015", 21 pgs.
"U.S. Appl. No. 14/242,459, Non Final Office Action dated Jan. 5, 2015", 11 pgs.
"U.S. Appl. No. 14/242,459, Pre-Brief Conference request filed Sep. 15, 2015", 5 pgs.
"U.S. Appl. No. 14/242,459, Response filed Feb. 19, 2015 to Non Final Office Action dated Jan. 5, 2015", 9 pgs.
"U.S. Appl. No. 14/242,459, Response filed Jul. 21, 2015 to Final Office Action dated Jun. 19, 2015", 11 pgs.
"U.S. Appl. No. 14/260,677, Advisory Action dated Dec. 9, 2016", 3 pgs.
"U.S. Appl. No. 14/260,677, Advisory Action dated Dec. 28, 2016", 5 pgs.
"U.S. Appl. No. 14/260,677, Corrected Notice of Allowance dated Nov. 3, 2017", 2 pgs.
"U.S. Appl. No. 14/260,677, Examiner Interview Summary dated Aug. 28, 2017", 3 pgs.
"U.S. Appl. No. 14/260,677, Final Office Action dated Sep. 23, 2016", 20 pgs.
"U.S. Appl. No. 14/260,677, Non Final Office Action dated Jun. 6, 2017", 18 pgs.
"U.S. Appl. No. 14/260,677, Non Final Office Action dated Jun. 7, 2016", 15 pgs.
"U.S. Appl. No. 14/260,677, Notice of Allowability dated Sep. 25, 2017", 2 pgs.
"U.S. Appl. No. 14/260,677, Notice of Allowance dated Sep. 12, 2017", 7 pgs.
"U.S. Appl. No. 14/260,677, Response filed Aug. 29, 2017 to Non Final Office Action dated Jun. 6, 2017", 11 pgs.
"U.S. Appl. No. 14/260,677, Response filed Sep. 6, 2016 to Non Final Office Action dated Jun. 7, 2016", 9 pgs.
"U.S. Appl. No. 14/260,677, Response filed Dec. 1, 2016 to Final Office Action dated Sep. 23, 2016", 11 pgs.
"U.S. Appl. No. 14/336,758, Advisory Action dated Mar. 9, 2016", 3 pgs.
"U.S. Appl. No. 14/336,758, Appeal Brief filed May 20, 2016", 18 pgs.
"U.S. Appl. No. 14/336,758, Appeal Decision mailed May 17, 2017", 6 pgs.
"U.S. Appl. No. 14/336,758, Examiner Interview Summary dated Dec. 20, 2017", 3 pgs.
"U.S. Appl. No. 14/336,758, Examiner's Answer to Appeal Brief mailed Jul. 12, 2016", 13 pgs.
"U.S. Appl. No. 14/336,758, Final Office Action dated Nov. 25, 2015", 11 pgs.
"U.S. Appl. No. 14/336,758, Non Final Office Action dated Jan. 29, 2015", 10 pgs.
"U.S. Appl. No. 14/336,758, Non Final Office Action dated Jul. 23, 2015", 10 pgs.
"U.S. Appl. No. 14/336,758, Notice of Allowance dated May 4, 2018", 8 pgs.
"U.S. Appl. No. 14/336,758, Notice of Allowance dated Aug. 1, 2017" 8 pgs.
"U.S. Appl. No. 14/336,758, Notice of Allowance dated Sep. 14, 2017", 8 pgs.
"U.S. Appl. No. 14/336,758, PTO Response to Rule 312 Communication dated Dec. 21, 2017", 2 pgs.
"U.S. Appl. No. 14/336,758, Reply Brief filed Aug. 31, 2016", 4 pgs.

(56) References Cited

OTHER PUBLICATIONS

"U.S. Appl. No. 14/336,758, Response filed Feb. 25, 2016 to Final Office Action dated Nov. 25, 2015", 5 pgs.
"U.S. Appl. No. 14/336,758, Response filed Apr. 28, 2015 to Non Final Office Action dated Jan. 29, 2015", 10 pgs.
"U.S. Appl. No. 14/336,758, Response filed Sep. 22, 2015 to Non Final Office Action dated Jul. 23, 2015", 14 pgs.
"U.S. Appl. No. 15/637,561, Preliminary Amendment filed Oct. 5, 2017", 7 pgs.
"U.S. Appl. No. 15/726,102, Preliminary Amendment filed Oct. 6, 2017", 7 pgs.
"U.S. Appl. No. 15/882,472, Preliminary Amendment Filed Apr. 23, 2018", 7 pgs.
"Australian Application Serial No. 2011101152, Examination Report No. 1 dated May 6, 2013", 4 pgs.
"Australian Application Serial No. 2011101152, Response filed Sep. 17, 2013 to Examination Report No. 1 dated May 6, 2013", 13 pgs.
"Australian Application Serial No. 2011299234, Amendment filed Apr. 4, 2013", 11 pgs.
"Australian Application Serial No. 2011299234, Amendment filed Aug. 25, 2015", 26 pgs.
"Australian Application Serial No. 2011299234, First Examiner Report dated Aug. 25, 2014", 3 pgs.
"Australian Application Serial No. 2011299234, Response filed Oct. 26, 2015 to Subsequent Examiners Report dated Sep. 4, 2015", 3 pgs.
"Australian Application Serial No. 2011299234, Subsequent Examiners Report dated Sep. 4, 2015", 4 pgs.
"Australian Application Serial No. 2014318962, First Examination Report dated Apr. 5, 2018", 6 pgs.
"Australian Application Serial No. 2016201377, First Examiner Report dated Feb. 1, 2017", 3 pgs.
"Australian Application Serial No. 2016201377, Response filed May 25, 2017 to First Examiner Report dated Feb. 1, 2017", 55 pgs.
"Australian Application Serial No. 2016201377, Response filed Aug. 9, 2017 to Subsequent Examiners Report dated Jun. 6, 2017", 2 pgs.
"Australian Appliation Serial No. 2016201377, Subsequent Examiners Report dated Jun. 6, 2017", 3 pgs.
"Australian Application Serial No. 2016201377, Subsequent Examiners Report dated Aug. 23, 2017", 3 pgs.
"Brazilian Application Serial No. BR1120130055251, Voluntary Amendment filed Sep. 8, 2014", with English Translation, 9 pgs.
"Canadian Application Serial No. 2,810,521, Office Action dated Mar. 1, 2018", 5 pgs.
"Canadian Application Serial No. 2,810,521, Office Action dated Jun. 8, 2017", 3 pgs.
"Canadian Application Serial No. 2,810,521, Response filed Sep. 7, 2017 to Office Action dated Jun. 8, 2017", 15 pgs.
"European Application Serial No. 14843569.6, Extended European Search Report dated Mar. 6, 2017", 10 pgs.
"European Application Serial No. 14843569.6, Response filed Sep. 20, 2017 to Extended European Search Report dated Mar. 6, 2017", 12 pgs.
"European Application Serial No. 14843569.6, Response filed Oct. 26, 2016 to Communication pursuant to Rules 161(2) and 162 EPC dated Apr. 22, 2016", 9 pgs.
"European Application Serial No. 14844441.7, Extended European Search Report dated Mar. 2, 2017", 10 pgs.
"European Application Serial No. 14844441.7, Response filed Sep. 20, 2017 to Extended European Search Report dated Mar. 2, 2017", 45 pgs.
"European Application Serial No. 14844441.7, Response filed Oct. 26, 2016 to Communication pursuant to Rules 161(2) and 162 EPC dated Apr. 19, 2016", 7 pgs.
"International Application Serial No. PCT/US2011/50712, International Preliminary Report on Patentability dated Mar. 21, 2013", 8 pgs.
"International Application Serial No. PCT/US2011/50712, International Search Report dated Jan. 5, 2012", 2 pgs.
"International Application Serial No. PCT/US2011/50712, Written Opinion dated Jan. 5, 2012", 6 pgs.
"International Application Serial No. PCT/US2014/054701, International Preliminary Report on Patentability dated Mar. 24, 2016", 8 pgs.
"International Application Serial No. PCT/US2014/054701, International Search Report dated Jan. 12, 2015", 2pgs.
"International Application Serial No. PCT/US2014/054701, Written Opinion dated Jan. 12, 2015", 6 pgs.
"International Application Serial No. PCT/US2014/054702, International Preliminary Report on Patentability dated Mar. 24, 2016", 6 pgs.
"International Application Serial No. PCT/US2014/054702, International Search Report dated Nov. 19, 2014", 2 pgs.
"International Application Serial No. PCT/US2014/054702, Written Opinion dated Nov. 19, 2014", 4 pgs.
"Japanese Application Serial No. 2016-542039, Office Action dated May 15, 2018", With English Translation, 10 pgs.
"Japanese Application Serial No. 2016-542040, Office Action dated May 22, 2018", With English translation, 7 pgs.
"Korean Application Serial No. 10-2016-7009259, Notice of Preliminary Rejection dated Apr. 11, 2018", w/ English translation, 14 pgs.
"Mexican Application Serial No. MX/a/2016/003114, Office Action dated Nov. 16, 2017", With English Abstract, 2 pgs.
"Mexican Application Serial No. MX/a/2016/003114, Response filed Feb. 6, 2018 to Office Action dated Nov. 16, 2017", w/English Abstract, 8 pgs.
"Mexican Application Serial No. MX/a/2016/003115, Office Action dated Nov. 7, 2017", With English Abstract, 2 pgs.
"Mexican Application Serial No. MX/a/2016/003115, Response filed Feb. 19, 2018 to Office Action dated Nov. 7, 2017", w/English Abstract, 6 pgs.
"Korean Application Serial No. 10-2016-7009259, response Filed Jun. 11, 2018 to Notice of Preliminary Rejection dated Apr. 11, 2018", 28 pgs.
U.S. Appl. No. 12/877,993, filed Sep. 8, 2010, System and Method for Displaying Information Related to Video Programs in a Graphical User Interface.
U.S. Appl. No. 15/882,472, filed Jan. 29, 2018, System and Method of Displaying Content and Related Social Media Data.
U.S. Appl. No. 14/242,459, filed Apr. 1, 2014, Systems and Methods of Displaying Content.
U.S. Appl. No. 14/336,758, filed Jul. 21, 2014, Systems and Methods of Displaying Content.
"Australian Application Serial No. 2014318962, Response filed Aug. 29, 2018 to First Examination Report dated Apr. 5, 2018", 14 pgs.
"Chinese Application Serial No. 201480056859.2, Office Action dated Jul. 31, 2018", W/ English Translation, 17 pgs.
"European Application Serial No. 14844441.7, Communication Pursuant to Article 94(3) EPC dated Aug. 27, 2018", 7 pgs.
"Singapore Application No. 11201602200U Written Opinion dated Aug. 13, 2018", 4 pgs.

* cited by examiner

SYSTEMS AND METHODS OF DISPLAYING CONTENT

RELATED APPLICATIONS

This application is a continuation of U.S. patent application Ser. No. 14/336,758, filed on Jul. 21, 2014, which claims the benefit of U.S. Provisional Application No. 61/876,188, filed on Sep. 10, 2013, and U.S. Provisional Application No. 61/876,199, filed on Sep. 10, 2013, each of which are incorporated by reference in their respective entirety. This application is a continuation-in-part of U.S. patent application Ser. No. 14/242,459, filed Apr. 1, 2014, which is hereby incorporated by reference in its entirety, which claims the benefit of U.S. Provisional Application No. 61/876,188, filed on Sep. 10, 2013, and U.S. Provisional Application No. 61/876,199, filed on Sep. 10, 2013.

TECHNICAL FIELD

The present disclosure relates to the field of interactive television and graphical user interfaces.

BACKGROUND

Digital media playback capabilities may be incorporated into a wide range of devices, including digital televisions, including so-called "smart" televisions, laptop or desktop computers, tablet computers, e-book readers, personal digital assistants (PDAs), digital recording devices, digital media players, video gaining devices, digital cameras, cellular or satellite radio telephones, including so-called "smart" phones, dedicated video streaming devices, and the like. Digital media content may originate from a plurality of sources including, for example, over-the-air television providers, satellite television providers, cable television providers, online media-sharing services, including, online media streaming and downloading services, peer devices, and the like. Further, devices with digital media playback capabilities may be configured to output digital media to ultra-resolution displays.

Due to the wide range of content users may access on devices with digital media playback capabilities, traditional techniques for the organizing, sorting, and displaying available content choices may be less than ideal, particularly for televisions and secondary connected devices. Further, traditional electronic programming guides may be intended to be displayed on relatively smaller and/or lower resolution displays than the larger and higher resolution displays that are currently available or may be become available in the future.

SUMMARY

The following brief summary is not intended to include all features and aspects of the present invention, nor does it imply that the invention must include all features and aspects discussed in this summary. The present disclosure relates to the field of graphical user interfaces and more specifically describes techniques for presenting a user with dynamic interactive graphical user interfaces. In particular, this disclosure describes techniques for enabling content selection. In some examples, the techniques may be implemented in a device with digital media playback capabilities, including for example, laptop or desktop computers, tablet computers, smart phones, set top boxes, and televisions.

According to one example of the disclosure, a method for enabling content selection comprises displaying one or more sub-categories of content included within a category of content, wherein displaying one or more sub-categories of content includes displaying icons representing items of content included within each of the one or more sub-categories of content in a stack structure, wherein the one or more sub-categories of content are associated with a sub-category type, and enabling a user to change a sub-category type.

According to another example of the disclosure, a device for enabling content selection comprises one or more processors configured to display one or more sub-categories of content included within a category of content, wherein displaying one or more sub-categories of content includes displaying icons representing items of content included within each of the one or more sub-categories of content in a stack structure, wherein the one or more sub-categories of content are associated with a sub-category type, and enable a user to change a sub-category type.

According to another example of the disclosure, an apparatus for enabling content selection comprises means for displaying one or more sub-categories of content included within a category of content, wherein displaying one or more sub-categories of content includes displaying icons representing items of content included within each of the one or more sub-categories of content in a stack structure, wherein the one or more sub-categories of content are associated with a sub-category type, and means for enabling a user to change a sub-category type.

According to another example of the disclosure, a non-transitory computer-readable storage medium has instructions stored thereon that upon execution cause one or more processors of a device to display one or more sub-categories of content included within a category of content, wherein displaying one or more sub-categories of content includes displaying icons representing items of content included within each of the one or more sub-categories of content in a stack structure, wherein the one or more sub-categories of content are associated with a sub-category type, and enable a user to change a sub-category type.

The details of one or more examples are set forth in the accompanying drawings and the description below. Other features, objects, and advantages will be apparent from the description and drawings, and from the claims.

DETAILED DESCRIPTION

Figure 1:
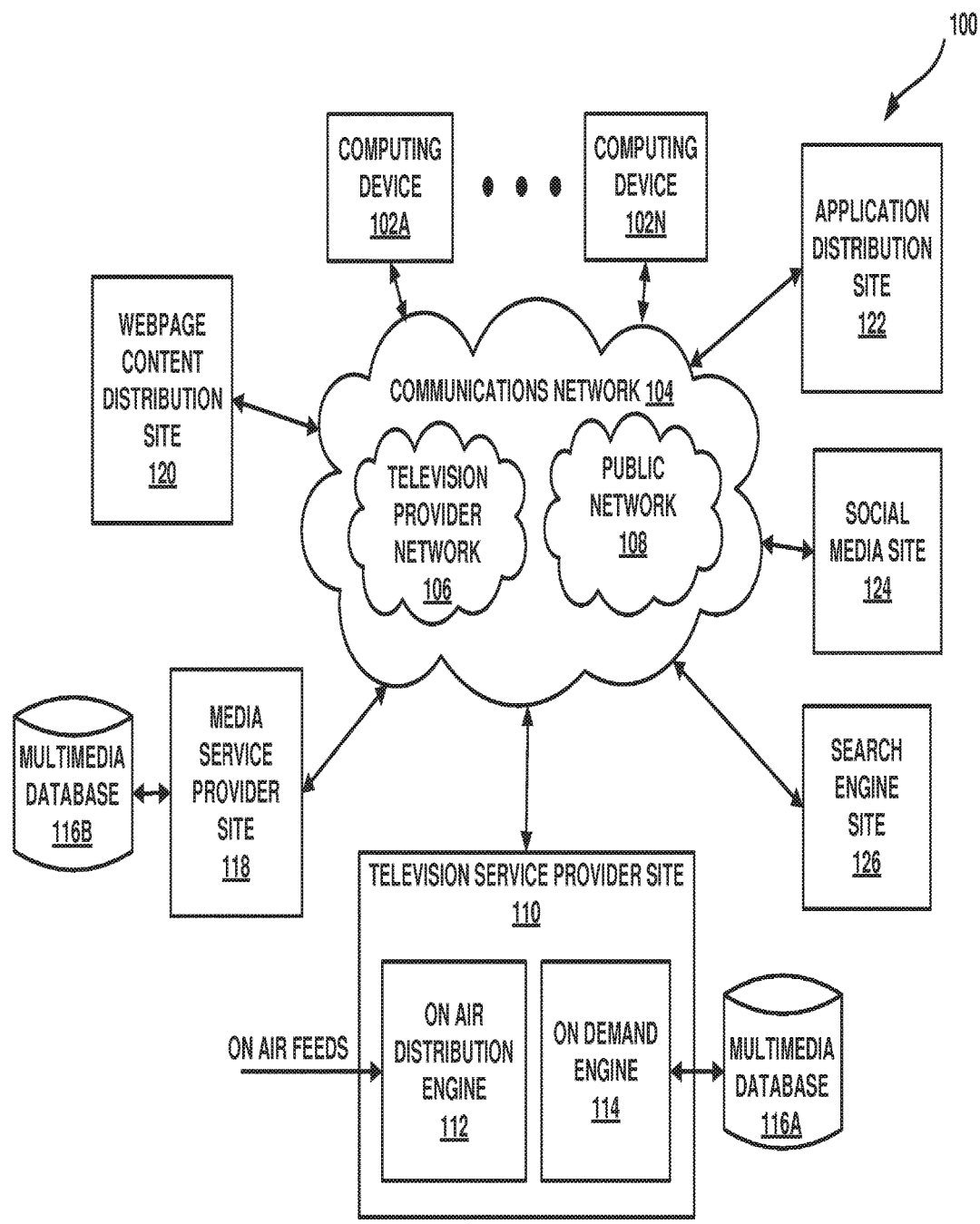
FIG. 1 is block diagram illustrating an example of a system that may implement one or more techniques of this disclosure.

Described herein are systems and methods for enabling the selection of content. Some embodiments extend to a machine-readable medium embodying instructions which, when executed by a machine, cause the machine to perform any one or more of the methodologies described herein. Other features will be apparent from the accompanying drawings and from the detailed description that follows. Examples merely typify possible variations. Unless explicitly stated otherwise, components and functions are optional and may be combined or subdivided, and operations may vary in sequence or may be combined or subdivided. In the following description, for purposes of explanation, numerous specific details are set forth to provide a thorough understanding of example embodiments. It will be evident to one skilled in the art, however, that the present subject matter may be practiced without these specific details.

Devices with digital media playback capabilities, including, for example, televisions, set top boxes, and mobile devices, may be configured to provide users thereof with graphical user interfaces that enable the selection of content. In some examples, these graphical user interfaces may be referred to as electronic program guides (EPGs). Traditional electronic program guides may be designed to only display content available through a television provider. Further, traditional electronic programming guides may have been designed for relatively smaller and/or lower resolution displays than the larger and higher resolution displays that are currently available or may be become available in the future. That is, traditional electronic program guides may have been designed when standard definition displays (576i resolutions) with a maximum size screen size of 32" were common. Whereas, current commercially available displays may be larger than 100" and may have resolutions as high as 3840 pixels by 2160 pixels. Further, even larger displays with higher resolutions are anticipated to be commercially available in the future. Displays with resolutions higher than standard or high definition displays may be referred to as ultra-resolution displays. Ultra-resolution displays, such as ultra-resolution televisions, increase the screen real-estate because more pixels can be seen by viewers allowing more content to be displayed efficiently. Further, smaller devices, such as tablet computers, may include ultra-resolution displays. Traditional electronic program guides may be less than ideal for use with ultra-resolution displays. The techniques describe herein may enable a user to more efficiently select content from a plurality of diverse sources.

Example embodiments described herein may allow for a more natural interaction with a graphical user interface by zooming back from content and surrounding it with relevant features and data. This mimics how users actually organize and interact with objects in the real world. Additionally the techniques described herein may leverage ultra-resolution displays to minimize text and content confusion by using thumbnail navigation. Thumbnail navigation may allow users to quickly and seamlessly move across content solely using icons representing content Example embodiments described herein may replace standard data that is represented in text form with high resolution graphics to reduce clutter and allow for easier browsing of large catalogs of content. These features may then be transported on many other devices beyond a television, creating a seamless interface that enhance the user experience. That is, the graphical user interfaces described herein may be displayed on a secondary display (e.g., a smart phone display) in conjunction with being displayed on a primary display (e.g., an ultra-resolution television).

FIG. 1 is block diagram illustrating an example of a system that may implement one or more techniques described in this disclosure. System 100 may be configured to enable content selection in accordance with the techniques described herein. In the example illustrated in FIG. 1, system 100 includes one or more computing devices 102A-102N, communications network 104, television service provider site 110, media service provider site 118, webpage content distribution site 120, application distribution site 122, social media site 124, and search engine site 126. System 100 may include software modules operating on one or more servers. Software modules may be stored in a memory and executed a processor. Servers may include one or more processors and a plurality of internal and/or external memory devices. Examples of memory devices include file servers, FTP servers, network attached storage (NAS) devices, local disk drives, or any other type of device or storage medium capable of storing data. Storage medium may include Blu-ray discs, DVDs, CD-ROMs, flash memory, or any other suitable digital storage media. When the techniques described herein are implemented partially in software, a device may store instructions for the software in a suitable, non-transitory computer-readable medium and execute the instructions in hardware using one or more processors.

System 100 represents an example of a system that may be configured to allow digital content, such as, for example, music, videos, images, webpages, messages, voice communications, and applications, to be distributed to and accessed by a plurality of computing devices, such as computing devices 102A-102N. In the example illustrated in FIG. 1, computing devices 102A-102N may include any device configured to transmit data to and/or receive data from communication network 104. For example, computing devices 102A-102N may be equipped for wired and/or wireless communications and may include set top boxes, digital video recorders, televisions, desktop, laptop, or tablet computers, gaming consoles, mobile devices, including, for example, "smart" phones, cellular telephones, and personal gaming devices. It should be noted that although example system 100 is illustrated as having distinct sites, such an illustration is for descriptive purposes and does not limit system 100 to a particular physical architecture. Functions of system 100 and sites included therein may be realized using any combination of hardware, firmware and/or software implementations.

Communications network 104 may comprise any combination of wireless and/or wired communication media. Communications network 104 may include coaxial cables, fiber optic cables, twisted pair cables, wireless transmitters and receivers, routers, switches, repeaters, base stations, or any other equipment that may be useful to facilitate communications between various devices and sites. Communications network 104 may operate according to a combination of one or more telecommunication protocols. Telecommunications protocols may include proprietary aspects and/or may include standardized telecommunication protocols. Examples of standardized telecommunications protocols include Digital Video Broadcasting (DVB) standards, Advanced Television Systems Committee (ATSC) standards, Integrated Services Digital Broadcasting (ISDB) standards, Data Over Cable Service Interface Specification (DOCSIS) standards, Global System Mobile Communications (GSM) standards, code division multiple access (CDMA) standards, 3rd Generation Partnership Project (3GPP) standards, European Telecommunications Standards Institute (ETSI) standards, Internet Protocol (IP) standards, Wireless Application Protocol (WAP) standards, and IEEE standards, such as, for example, one or more of the 802 standards.

As illustrated in FIG. 1, networks of different types may be defined within communications network 104. Networks may be defined according to physical and/or logical aspects. For example, networks that share the same physical infrastructure (e.g., coaxial cables) may be distinguished based on a primary service type (e.g., webpage access or television service). Physical and logical aspects of networks may be described according to a layered model. For example, layers of a model may respectively define physical signaling, addressing, channel access control, packet properties, and data processing in a communications system. One example of a layered model is the Open Systems Interconnection (OSI) model. In the example illustrated in FIG. 1, communications network 104 includes television provider network 106 and public network 108. It should be noted that although television provider network 106 and public network 108 are illustrated as distinct, television provider network 106 and public network 108 may share physical and/or logical aspects.

Television provider network 106 is an example of a network configured to provide a user with television services. For example, television provider network 106 may include public over-the-air television networks, public or subscription-based satellite television service provider networks, and public or subscription-based cable television provider networks. It should be noted that although in some examples television provider network 106 may primarily be used to provide television services, television provider network 106 may also provide other types of data and services according to any combination of the telecommunication protocols described herein.

Public network 108 is an example of a packet-based network, such as, a local area network, a wide-area network, or a global network, such as the Internet, configured to provide a user with World Wide Web based services. Public network 108 may be configured to operate according to Internet Protocol (IP) standards. It should be noted that although in some examples public network 108 may primarily be used to provide access to hypertext web pages, public network 108 may also provide other types of media content according to any combination of the telecommunication protocol described herein.

Referring again to FIG. 1, television service provider 110 represents an example of a television service provider site. Television service provider 110 may be configured to provide computing devices 102A-102N with television service. For example, television service provider 110 may be a public broadcast station, a cable television provider, or a satellite television provider and may be configured to provide television services to analog and/or digital televisions and set top boxes. In the example illustrated in FIG. 1, television service provider 110 includes on air distribution engine 112 and on demand engine 114. On air distribution engine 112 may be configured to receive a plurality of on air feeds and distribute the feeds to computing devices 102A-102N through television provider network 106. For example, on air distribution engine 112 may be configured to receive one or more over-the-air television broadcasts via a satellite uplink/downlink and distribute the over-the-air television broadcasts to one or more users of a subscription-based cable television service.

On demand engine 114 may be configured to access a multimedia library and distribute multimedia content to one or more of computing devices 102A-102N through television provider network 106. For example, on demand engine 114 may access multimedia content (e.g., music, movies, and TV shows) stored in multimedia database 116A and provide a subscriber of a cable television service with movies on a Pay Per View (PPV) basis. Multimedia database 116A may be a storage device configured to store multimedia content. It should be noted that multimedia content accessed through on demand engine 114 may also be located at various sites within system 100 (e.g., peer-to-peer distribution).

Media service provider site 118 represents an example of a multimedia service provider. Media service provider site 118 may be configured to access a multimedia library and distribute multimedia content to one or more of computing devices 102A-102N through public network 108. For example, media service provider site 118 may access multimedia (e.g., music, movies, and TV shows) stored in multimedia database 116B and provide a user of a media service with multimedia. Multimedia database 116B may be a storage device configured to store multimedia content. In one example, media service provider site 118 may be configured to provide content to one or more of computing devices 102A-102N using the Internet protocol suite. In some examples, a media service may be referred to as a streaming service. Commercial examples of media services may include Hulu, YouTube, Netflix, and Amazon Prime. As described above, television provider network 106 and public network 108 may share physical and logical aspects. Thus, content accessed by one or more of computing devices 102A-102N through media service provider site 118 may be transmitted through physical components of television provider network 106. For example, a user of a computing device may access the internet and multimedia content provided by a media service through a cable modem connected to a coaxial network maintained by a cable television provider.

Webpage content distribution site 120 represents an example of a webpage service provider. Webpage content distribution site 120 may be configured to provide hypertext based content to one or more of computing devices 102A-102N through public network 108. It should be noted that hypertext based content may include audio and video content. Hypertext content may be defined according to programming languages, such as, for example. Hypertext Markup Language (HTML), Dynamic HTML, and Extensible Markup Language (XML). Examples of webpage content distribution sites include the Wikipedia website and the United States Patent and Trademark Office website.

Application distribution site 122 represents an example of an application distribution service. Application distribution site 122 may be configured to distribute developed software applications to one or more of computing devices 102A-102N. In one example, software applications may include games and programs operable on computing devices. In other examples, software applications may be configured to allow a computing device to access content provided by a site in manner specific to the computing device. For example, software applications may be configured to provide enhanced or reduced functionality of a webpage to a mobile device or a set top box. Software applications may be developed using a specified programming language. Examples of programming languages include, Java™, Jini™, C, C++, Perl, UNIX Shell. Visual Basic, and Visual Basic Script. In some examples, developers may write software applications using a software development kit (SDK) provided by a device manufacturer or a service provider. In the example where one or more of computing devices 102A-102N are mobile devices, application distribution site 122 may be maintained by a mobile device manufacturer, a service provider, and/or a mobile device operating system provider. In the example where one or more of computing devices 102A-102N are set top boxes, application distribution site 108 may be maintained by a set top box manufacturer, a service provider, and/or an operating system provider. In some examples, an application distribution site may be referred to as an app store. Examples of commercially available application distribution sites include Google Play, the Apple App Store, BlackBerry World, Windows Phone Store, and the Amazon Appstore.

Social media site 124 represents an example of a social media service. Social media site 124 may be configured to allow users of computing devices 102A-102N to communicate with one another. Social media site 124 may be configured to host profile pages corresponding to users of computing devices 102A-102N. For example, social media site 124 may be configured such that users of computing devices 102A-102N are able to display messages and upload photos, videos, and other media to a user's profile page. Examples of commercially available social media sites include Facebook, YouTube, Linkedin, Google Plus, Twitter, Flickr, and Instagram. In addition to allowing users to maintain profile pages, social media site 124 may be configured to generate analytical data based on information included in user profile pages and/or user activity. For example, social media site 124 may be configured to track the popularity of a news story based on comments provided by users of computing devices 102A-102N. As described in detail below, the techniques described herein may allow users of computing devices 102A-102N to incorporate functions of social media sites to share content and recommendations with other users. For example, users may discover content endorsed by other users.

Search engine site 126 represents an example of a content search service. Search engine site 126 may be a service configured to allow users of computing devices 102A-102N to search for content available through communications network 104. Search engine site 126 may be configured to receive queries from computing devices 102A-102N and provide a list of search results to computing devices 102A-102N. For example, search engine site 126 may be configured such that users of computing devices 102A-102N are presented with a webpage including a search query field and are able to search content based on keywords. Examples of commercially available search engine sites include Google, Bing, and Yahoo! Further, search engine site 126 may be configured to generate analytical data based on information included in search queries. For example, search engine site 126 may be configured to track the popularity of an actress based on the number of times a query related to the actress is provided by users of computing devices 102A-102N.

Figure 2A:
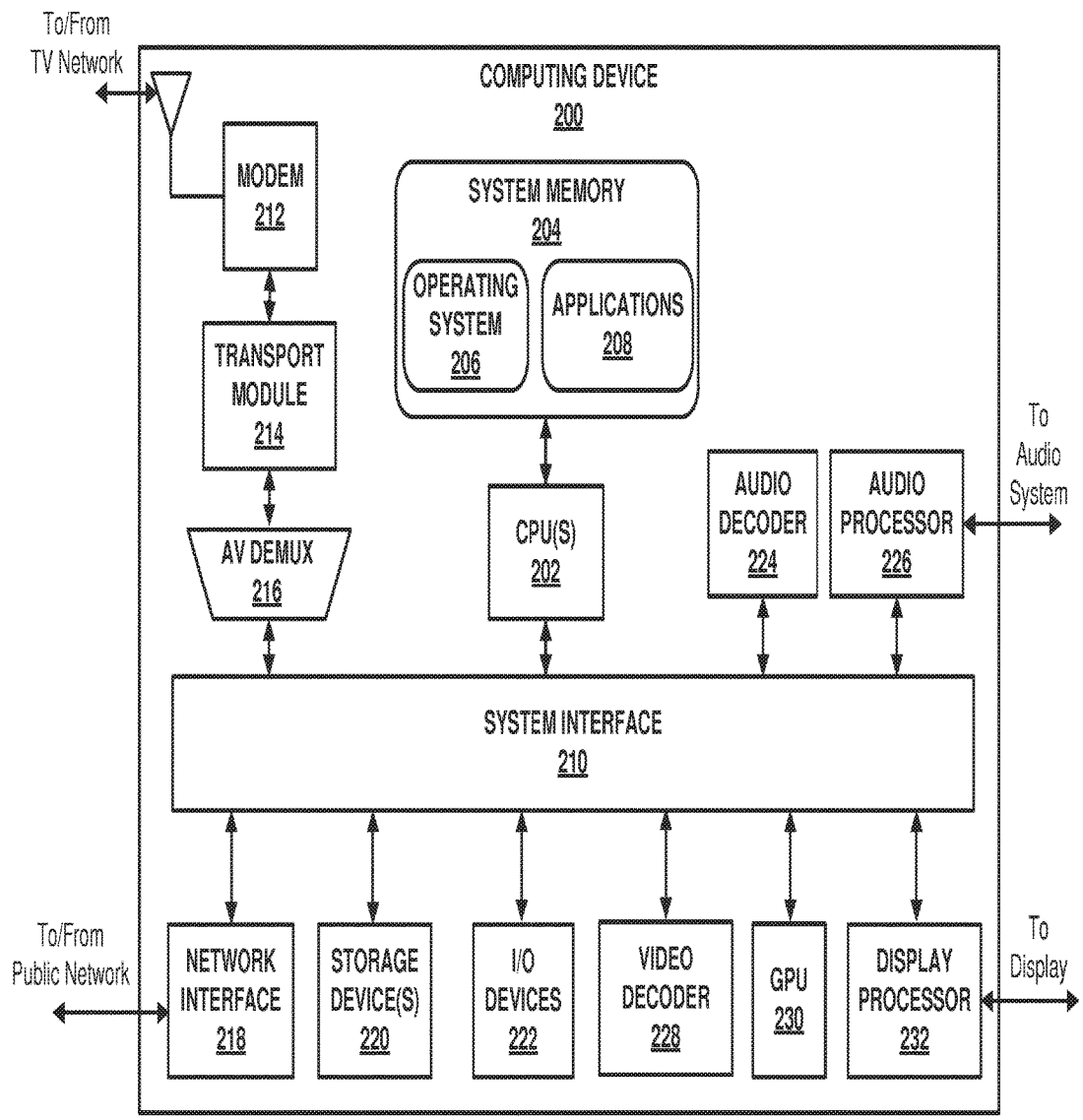
FIG. 2A is a block diagram illustrating an example of a computing device that may implement one or more techniques of this disclosure.

FIG. 2A is a block diagram illustrating an example of a computing device that may implement one or more techniques of this disclosure. Computing device 200 is an example of a computing device that may be configured to transmit data to and receive data from a communications network, allow a user to access multimedia content, and execute one or more applications. Computing device 200 may include or be part of a stationary computing device (e.g., a desktop computer, a television, a set-top box, a gaming console, a dedicated multimedia streaming device, or a digital video recorder), a portable computing device (e.g., a mobile phone, a laptop, a personal data assistant (PDA), or a tablet device) or another type of computing device. In the example illustrated in FIG. 2A, computing device 200 is configured to send and receive data via a television network, such as, for example, television network 106 described above and send and receive data via a public network, such as, for example, public network 108. It should be noted that in other examples, computing device 200 may be configured to send and receive data through one of a television network 106 or a public network 108. The techniques described herein may be utilized by devices configured to communicate using any and all combinations of communications networks.

As illustrated in FIG. 2A, computing device 200 includes central processing unit(s) 202, system memory 204, system interface 210, modem 212, transport module 214, AV demux 216, network interface 218, storage devices 220, I/O devices 222, audio decoder 224, audio processor 226, video decoder 228, graphics processing unit 230, and display processor 232. As illustrated in FIG. 2, system memory 106 includes operating system 206 and applications 208. Each of processor(s) 202, system memory 204, system interface 210, modem 212, transport module 214, AV demux 216, network interface 218, storage devices 220, I/O devices 222, audio decoder 224, audio processor 226, video decoder 228, graphics processing unit 230, and display processor 232 may be interconnected (physically, communicatively, and/or operatively) for inter-component communications and may be implemented as any of a variety of suitable circuitry, such as one or more microprocessors, digital signal processors (DSPs), application specific integrated circuits (ASICs), field programmable gate arrays (FPGAs), discrete logic, software, hardware, firmware or any combinations thereof. It should be noted that although example computing device 200 is illustrated as having distinct functional blocks, such an illustration is for descriptive purposes and does not limit computing device 200 to a particular hardware architecture. Functions of computing device 200 may be realized using any combination of hardware, firmware and/or software implementations.

CPU(s) 202 may be configured to implement functionality and/or process instructions for execution in computing device 200. CPU(s) 202 may be capable of retrieving and processing instructions, code, and/or data structures for implementing one or more of the techniques described herein. Instructions may be stored on a computer readable medium, such as system memory 204 or storage devices 220. CPU(s) 202 may include multi-core central processing units.

System memory 204 may be described as a non-transitory or tangible computer-readable storage medium. In some examples, system memory 204 may provide temporary and/or long-term storage. In some examples, system memory 204 or portions thereof may be described as non-volatile memory and in other examples portions of system memory 204 may be described as volatile memory. Examples of volatile memories include random access memories (RAM), dynamic random access memories (DRAM), and static random access memories (SRAM). Examples of non-volatile memories include magnetic hard discs, optical discs, floppy discs, flash memories, or forms of electrically programmable memories (EPROM) or electrically erasable and programmable (EEPROM) memories.

System memory 204, may be configured to store information that may be used by computing device 200 during operation. System memory 204 may be used to store program instructions for execution by CPU(s) 202 and may be used by software or applications running on computing device 200 to temporarily store information during program execution. For example, system memory 204 may store instructions associated with operating system 206 and applications 208. Applications 208 may include applications implemented within or executed by computing device 200 and may be implemented or contained within, operable by, executed by, and/or be operatively/communicatively coupled to components of computing device 200. Applications 208 may include instructions that may cause CPU(s) 202 of computing device 200 to perform particular functions. Applications 208 may include algorithms which are expressed in computer programming statements, such as, for-loops, while-loops, if-statements, do-loops, etc. Applications 208 may be distributed to computing device 200 through an application distribution site, such as, for example, application distribution site 122 described above.

As further illustrated in FIG. 2A, applications 208 may execute in conjunction with operating system 206. That is, operating system 206 may be configured to facilitate the interaction of applications 208 with CPUs(s) 202, and other hardware components of computing device 200. It should be noted that in some examples, components of operating system 206 and components acting in conjunction with operating system 206 may be referred to as middleware. The techniques described herein may be utilized by devices configured to operate using any and all combinations of software architectures. Operating system 206 may be an operating system designed to be installed on laptops, desktops, smartphones, tablets, set-top boxes, digital video recorders, televisions and/or gaming devices. In one example, operating system 206 may include one or more of operating systems or middleware components developed by OpenTV, Windows operating systems, Linux operation systems. Mac operating systems. Android operating systems, and any and all combinations thereof.

System interface 210, may be configured to enable communications between components of computing device 200. In one example, system interface 210 comprises structures that enable data to be transferred from one peer device to another peer device or to a storage medium. For example, system interface 210 may include a chipset supporting Accelerated Graphics Port ("AGP") based protocols, Peripheral Component Interconnect (PCI) bus based protocols, such as, for example, the PCI Express™ ("PCIe") bus specification, which is maintained by the Peripheral Component Interconnect Special Interest Group, or any other form of structure that may be used to interconnect peer devices.

Storage devices 220 represent memory of computing device 200 that may be configured to store relatively larger amounts of information for relatively longer periods of time than system memory 204. For example, in the example where computing device 200 is included as part of a digital video recorder, storage devices 220 may be configured to store numerous video files. Similar to system memory 204, storage device(s) 220 may also include one or more non-transitory or tangible computer-readable storage media. Storage device(s) 220 may include internal and/or external memory devices and in some examples may include volatile and non-volatile storage elements. Examples of memory devices include file servers, an FTP servers, network attached storage (NAS) devices, a local disk drive, or any other type of device or storage medium capable of storing data. Storage medium may include Blu-ray discs, DVDs, CD-ROMs, flash memory, or any other suitable digital storage media.

I/O devices 222 may be configured to receive input and provide output during operation of computing device 200. Input may be generated from an input device, such as, for example, a push-button remote control, a motion based remote control, a device including a touch-sensitive screen, a device including a track pad, a mouse, a keyboard, a microphone, a video camera, a motion sensor, or any other type of device configured to receive user input In one example, an input device may include an advanced user input device, such as a smart phone or a tablet computing device. For example, an input device may be a secondary computing device and may be configured to receive user input via touch gestures, buttons on the secondary computing device, and/or voice control. Further, in some examples, an input device may include a display that is configured to display the graphical users interfaces described herein. For example, in the case where computing device 200 includes a television, an input device may include a smart phone in communication with the television. In this example, a user may provide commands to a television by activating portions of a graphical user interface displayed on a smart phone. Output may be provided to output devices, such as, for example internal speakers, an integrated display device, and/or external components, such as, a secondary computing device. In some examples, I/O device(s) 222 may be operatively coupled to computing device 200 using a standardized communication protocol, such as for example, Universal Serial Bus protocol (USB), Bluetooth, ZigBee or a proprietary communications protocol, such as, for example, a proprietary infrared communications protocol.

Figure 2B:
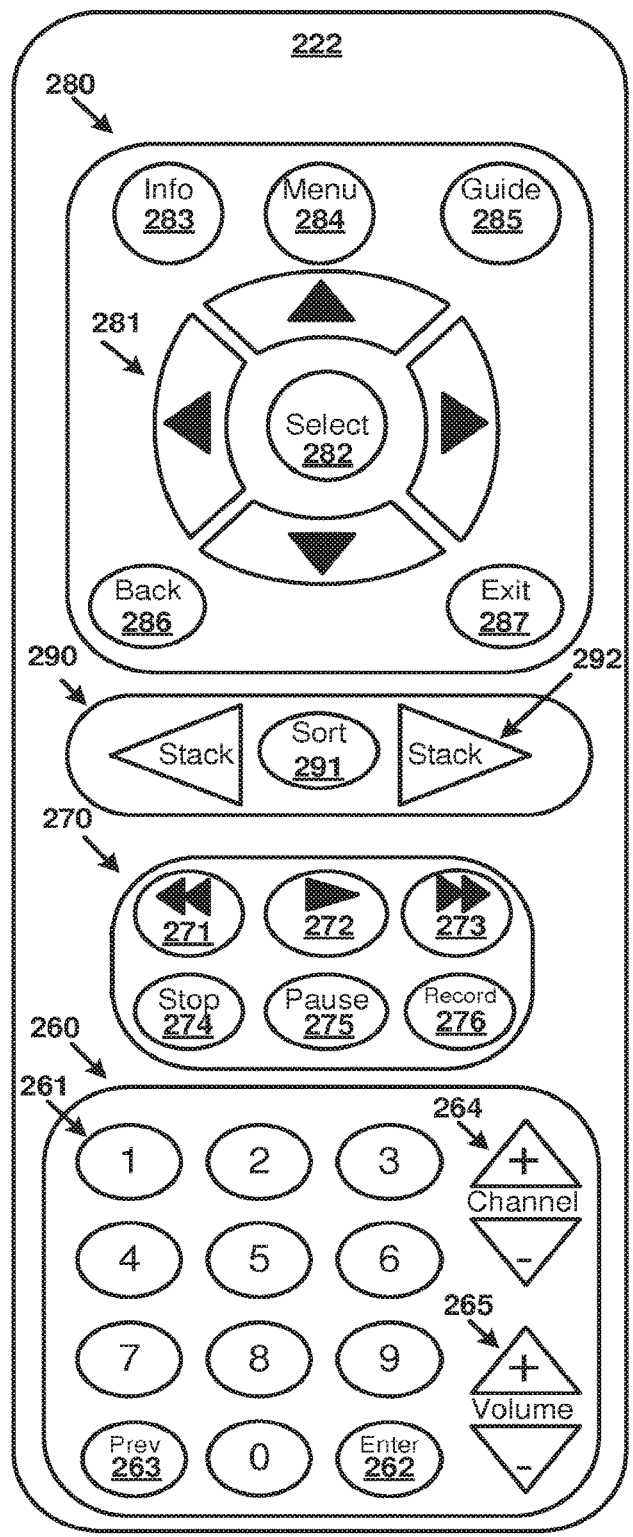
FIG. 2B is a conceptual diagram illustrating an example of an input/output device that may implement one or more techniques of this disclosure.

FIG. 2B is a conceptual diagram illustrating an example of an input/output device that may implement one or more techniques of this disclosure. In the example illustrated in FIG. 2B, I/O device 222 is illustrated as a push-button remote control. It should be noted that while I/O device 222 is illustrated as a push-button remote control in the example illustrated in FIG. 2B, in other examples, the functionality of I/O device 222 may be implemented using other I/O devices, such as, for example, a secondary computing device in communication with a primary computing device. Further, in other examples, functions achieved by activation of buttons of I/O device 222 may be achieved through other types of user inputs. For example, in the case where an I/O device includes a touchscreen, gesture recognition, and/or voice recognition, virtual buttons may be presented on the touchscreen and functions achieved by activation of buttons on I/O device 222 may be achieved through any and all combinations of virtual button activation, motion gestures, and/or voice commands. In one example, an I/O device may have voice recognition capabilities and a function achieved by activation of sort button 291 may be achieve by a user saying "sort," "change sorting order," "sort by genre," or a similar phrase.

In the example illustrated in FIG. 2B, I/O device 222 includes basic television controls 260, playback controls 270, navigational controls 280, and stack structure controls 290. Basic television controls 260 may be configured to enable a user to perform basic tuning and volume control functions associated with viewing television programming. As illustrated in FIG. 2B, basic television controls 260 include numeric keypad 261, enter button 262, previous channel button 263, channel change buttons 264, and volume control buttons 265. Numeric keypad 261, enter button 262, previous channel button 263, and channel change buttons 264 may be configured to enable a user to tune to a particular analog and/or digital channel. Upon a user entering a sequence of numbers using numeric keypad 261 and, optionally, additionally activating enter key 262, a tuner may tune to a specified channel. Upon activation of previous channel button 263, a tuner may tune to a previously tuned channel. Activation of "+" and "−" channel buttons 264 may respectively cause a tuner to tune to the respective next channel in a sequence of channels. Activation of "+" and "−" volume control buttons 265 may respectively cause the output of an audio system to be increased or decreased. It should be noted that although the basic television controls 260 may be configured to enable a user to perform basic tuning and volume control functions associated with a television, in some examples, basic television controls 260 may be used to perform other functions associated with a computing device. For example, in the case where a graphical user interface is presented to a user, activation of "+" and "−" channel buttons 264 may cause respective scroll up and scroll down functions to be performed.

In one example, activation of "+" and "−" channel buttons 264 may cause a selected navigational item 304, as described in detail below, to change. For example, when menu bar 302 is active, activation of "+" channel button may cause a navigational item to the left of the selected navigational item to be selected and activation of "−" channel button may cause a navigational item to the right of the selected navigational item to be selected. In one example, activation of "+" and "−" channel buttons 264 may cause a selected stack structure, as described in detail below, to change. For example, when stack structure selection is active, activation of "+" channel button may cause a stack structure to the left of the selected stack structure to be selected and activation of "−" channel button may cause a stack structure to the right of the selected stack structure to be selected.

Playback controls 270 may be configured to enable a user to control the playback of and/or record multimedia content. For example, playback controls 270 may enable a user to control the playback of a video originating from a media service provider site, an on demand engine, and/or a personal video recorder (PVR). As illustrated in FIG. 2B, playback controls 270 include reverse playback button 271, normal playback button 272, forward playback button 273, stop playback button 274, pause playback button 275, and record button 276. Reverse playback button 271 may enable a user to navigate to a previous point in a multimedia sequence. Upon activation, normal playback button 272 may cause normal playback of an item of multimedia content to begin or resume. Forward playback button 273 may enable a user to navigate to a future point in a multimedia sequence. Upon activation, stop playback button 274 may cause the playback of an item of multimedia content to cease. Upon activation, pause playback button 275 may cause the playback of an item of multimedia content to be paused. Record button 276 may enable a user to cause an item of multimedia content to be stored to a storage device. In one example, record button 276 may enable a user to record content to a storage device. It should be noted that although playback controls 270 may be configured to enable a user to control the playback of and/or record multimedia content, in some examples playback controls 270 may be used to perform other functions associated with a computing device. For example, in the case where a graphical user interface is presented to a user, activation of record button 276 may cause a graphical user interface for scheduling recordings to be displayed.

In one example, activation of reverse playback button 271 and forward playback button 273 may cause a selected navigational item 304, as described in detail below, to change. For example, when menu bar 302 is active, activation of reverse playback button 271 may cause a navigational item to the left of the selected navigational item to be selected and activation of forward playback button 273 may cause a navigational item to the right of the selected navigational item to be selected. In one example, activation of reverse playback button 271 and forward playback button 273 may cause a selected stack structure, as described in detail below, to change. For example, when stack structure selection is active, activation of reverse playback button 271 may cause a stack structure to the left of the selected stack structure to be selected and activation of forward playback button 273 may cause a stack structure to the right of the selected stack structure to be selected.

As described above, devices with digital media playback capabilities, including, for example, televisions, set top boxes, and mobile devices, may be configured to provide users thereof with graphical user interfaces that enable the selection of content. Navigational controls 280 may be configured to enable a user to navigate graphical user interfaces and select content using a graphical user interface. In one example, navigational controls 280 may be configured to enable a user to navigate graphical user interfaces and select content using one of more of the example graphical user interfaces described below with respect to FIGS. 3-10.

In the example illustrated in FIG. 2B, navigational controls 280 include navigational arrow buttons 281, select button 282, information button 283, menu button 284, guide button 285, back button 286, and exit button 287. Navigational arrow buttons 281 may be configured to move the position of a cursor associated with a graphical user interface and/or change the selection of an item included in a graphical user interface. For example, navigational arrow buttons 281 may enable the user to change the selection of an icon in an electronic programming guide representing a television program (e.g., change selected item in a grid guide). As described in detail below, in one example, navigational arrow buttons 281 may cause a selected navigational item 304 and/or a selected stack structure to change.

Select button 282 may enable a user to further select an item of content. As described in detail below, an icon representing an item of content may be associated with multiple levels of selection. In one example, consecutive activations of select button 282 may cause respective levels of selection to occur. Information button 283 may be configured to cause additional information associated with an item of content of to be displayed. For example, when an icon representing an item of content is initially selected, activation of information button 283 may cause information associated with the content (e.g., cast and crew information) to be displayed.

Menu button 284, guide button 285, back button 286, and exit button 287 may be configured to enable a user to cause different graphical user interfaces to be presented. Upon activation, menu button 284 may cause a graphical user interface including a high level menu to be displayed. In one example, a high level menu may include a menu that enables a user to change settings associated with the operation of a computing device. In one example, a high-level menu may include a menu that enables a user to select a user profile (e.g., a log-in graphical user interface). Upon activation, guide button 285 may be configured to provide a graphical user interface that enables a user to select content. In one example, upon activation of guide button 285, graphical user interface 300 described with respect to FIG. 3 below may be presented to a user.

Figure 7:
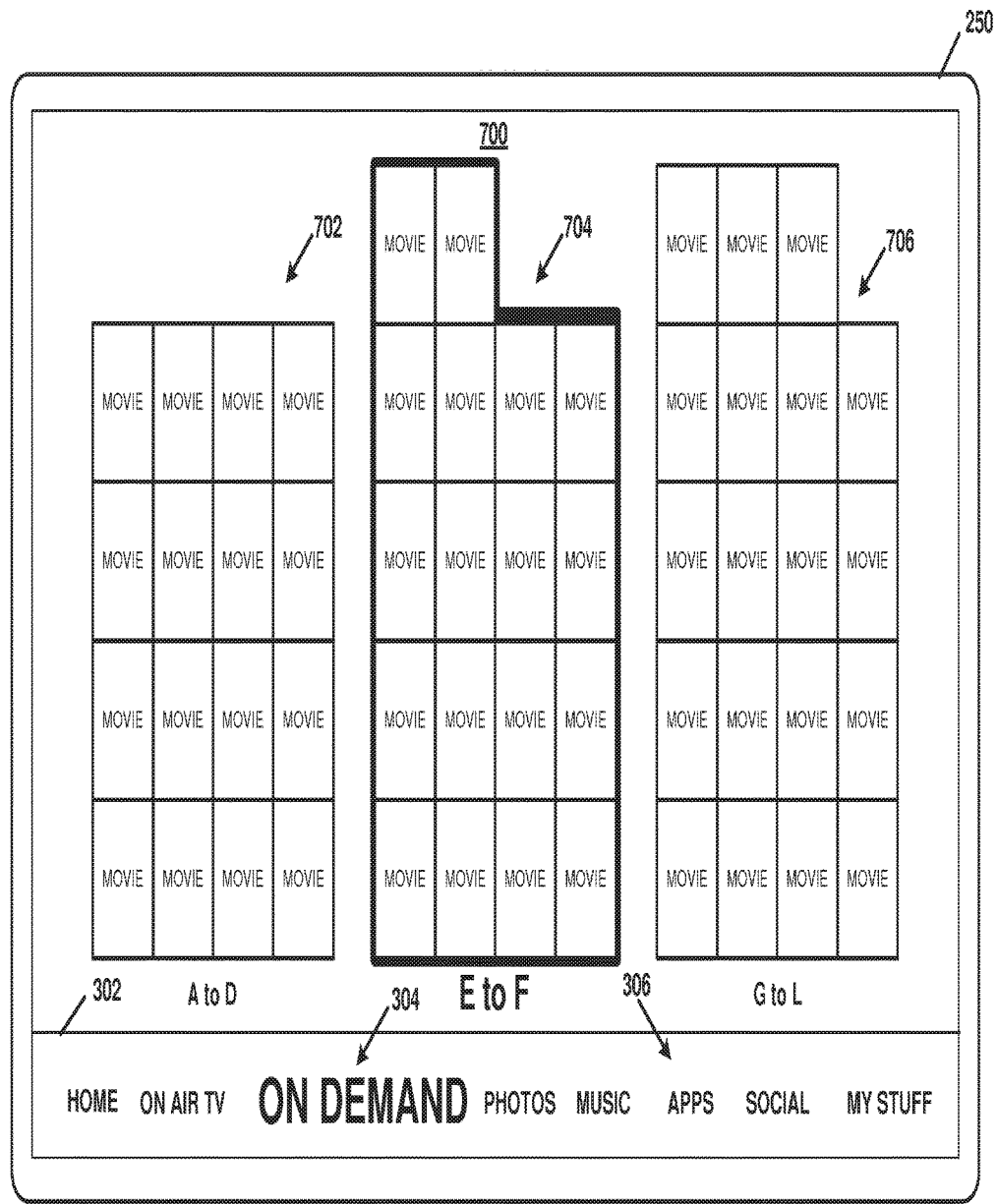
FIG. 7 is a conceptual diagram illustrating an example of a graphical user interface in accordance with one or more techniques of this disclosure.
Figure 8:
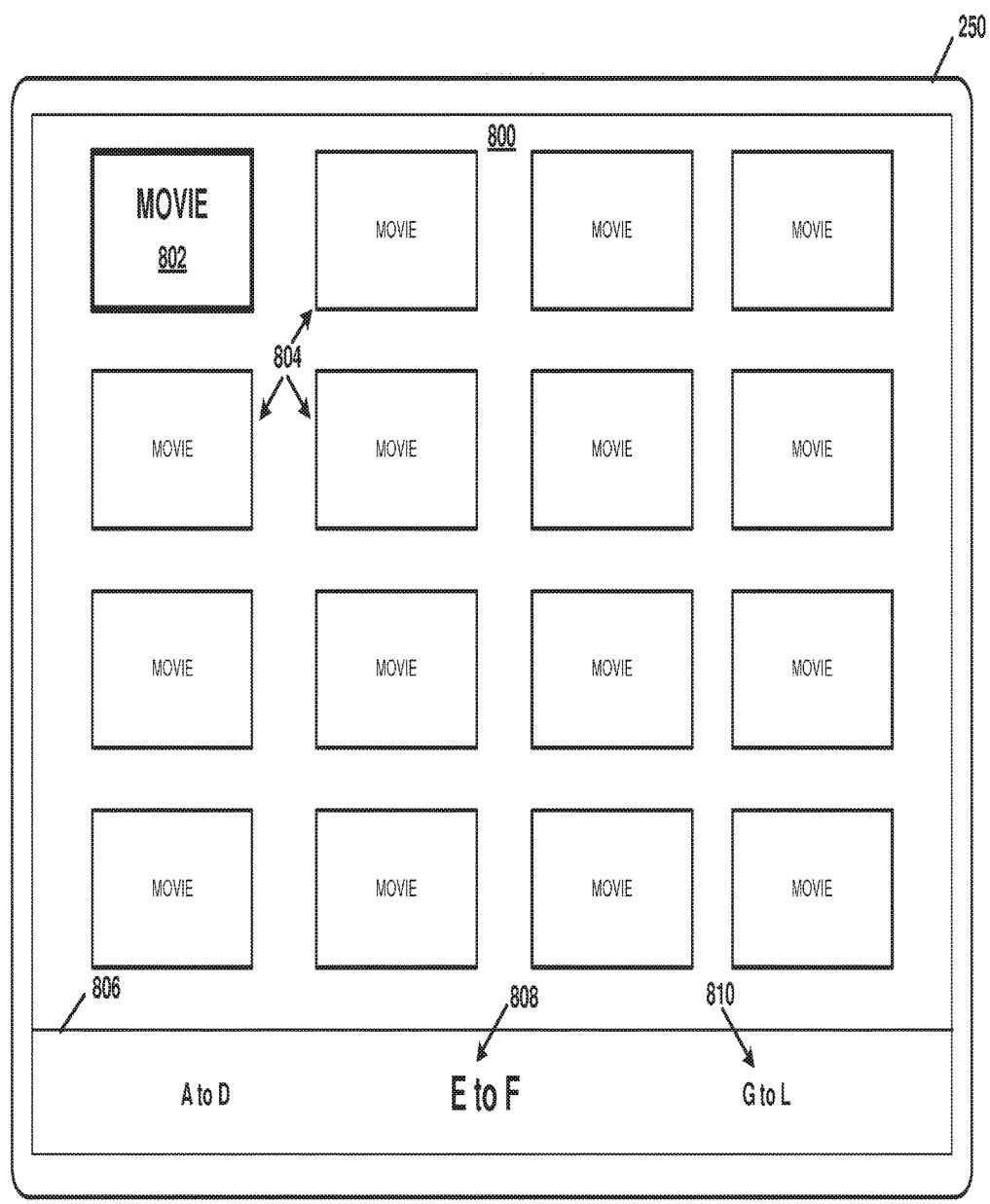
FIG. 8 is a conceptual diagram illustrating an example of a graphical user interface in accordance with one or more techniques of this disclosure.

Back button 286 may be configured to enable a user to return to a previous graphical user interface. For example, when graphical user interface 800), described below with respect to FIG. 8 is displayed, activation of last button 286, may cause graphical user interface 700, described below with respect to FIG. 7, to be displayed. Further in one example, as described in detail below, activation of back button 286 may cause menu bar 302 to be displayed and become active. Exit button 287 may be configured to enable a user to return to a full screen viewing mode. For example, when a graphical user interface is displayed, upon activation of exit button 287, the graphical user interface may "disappear" and full screen content viewing mode may be presented to a user.

As describe in detail below with respect to FIG. 4A-FIG. 7, icons representing items of content may be organized and presented to a user using stack structures. Stack structure controls 290 may be configured to enable a user to navigate and/or sort stack structures. As illustrated in FIG. 2B, stack structure controls 290 include sort button 291 and stack structure navigational buttons 292. Sort button 291 and stack structure navigational buttons 292 are described in detail below.

Referring again to FIG. 2A, computing device 200 is configured to send and receive data via a television network, such as, for example, television network 106 described above and send and receive data via a public network, such as, for example, public network 108. As described above, a communications network may be described based on a model including layers that define communication properties, such as, for example, physical signaling, addressing, channel access control, packet properties, and data processing in a communications system. In the example illustrated in FIG. 2A, modem 212, transport module 214, and AV demux 216 may be configured to perform lower layer processing associated with television network 106 and network interface 218 may be configured to perform lower layer processing associated with public network 108.

In one example, modem 212 may be configured to perform physical signaling, addressing, and channel access control according to the physical and MAC layers utilized in a television provider network, such as, for example, television provider network 106. In one example, modem 212 may configured to receive signals from a coaxial cable and/or an over the air signal and perform low level signal processing (e.g., demodulation). In one example, modem 212 may be configured to extract transport streams from signals received from a coaxial cable. In one example, a transport stream may be based on a transport stream defined by the Moving Pictures Experts Group (MPEG). In one example, a transport stream may include a plurality of program streams where each program stream respectively corresponds to a program available from a television network. Further, a transport stream may include a plurality of data streams (e.g., Program Map Table and EPG data).

Transport module 214 may be configured to receive data from modem 212 and process received data. For example, transport model 214 may be configured to receive a transport stream including a plurality of program streams and extract individual program streams from a received transport stream. In one example, a program stream may include a video stream, an audio stream, and a data stream. AV demux 216 may be configured to receive data from transport module 214 and process received data. For example, AV demux 216 may be configured to receive a program stream from transport module 214 and extract audio packets, video packets, and data packets. That is, AV demux 216 may apply demultiplexing techniques to separate video streams, audio streams, and data streams from a program stream. In one example, AV demux 216 may be configured to decapsulate packetized elementary video and audio streams from a transport stream defined according to MPEG-2 Part 1. It should be noted that although modem 212, transport module 214, and AV demux 216 are illustrated as having distinct functional blocks, the functions performed by modem 212, transport module 214, and AV demux 216 may be highly integrated and realized using any combination of hardware, firmware and/or software implementations.

Network interface 218 may be configured to enable computing device 200 to send and receive data via a public network. As described above, data sent or received via a public network may include data associated digital content, such as, for example, music, videos, images, webpages, messages, voice communications, and applications. Network interface 218 may include a network interface card, such as an Ethernet card, an optical transceiver, a radio frequency transceiver, or any other type of device configured to send and receive information. Network interface 218 may be configured to perform physical signaling, addressing, and channel access control according to the physical and MAC layers utilized in a public network, such as for example, public network 108. Further, in a manner similar to that described above with respect to transport module 214 and A/V demux 216, network interface 218 may be configured to extract audio packets, video packets, and data packets from a data stream. For example, network interface 218 may be configured to extract video packets, audio packets, and data packets according to one or more of internet protocol (IP), transport control protocol (TCP), real time streaming protocol (RTSP), user datagram protocol (UDP), real time protocol (RTP), MPEG transport stream protocols, and IPTV protocols. It should be noted, that the techniques described herein are generally applicable to any and all methods of digital content distribution and are not limited to particular communications network implementations. For example, the techniques described herein may be applicable to digital content originating from one or more of a broadcast, a multicast, a unicast, an over-the-top content source, a personal video recorder (PVR), and a peer-to-peer content source.

Referring again to FIG. 2A, data associated with digital content, such as, for example, music, videos, images, webpages, messages, voice communications, and applications may be stored in a computer readable medium, such as, for example, system memory 204 and storage devices 220. Data stored in a memory device may be retrieved and processed by CPU(s) 202, audio decoder 224, audio processor 226, video decoder 228, graphics processing unit 230, and display processor 232. As described above, CPU(s) 202 may be capable of retrieving and processing instructions, code, and/or data structures for implementing one or more of the techniques described herein. Each of audio decoder 224, audio processor 226, video decoder 228, graphics processing unit 230, and display processor 232 may also be capable of retrieving and processing instructions, code, and/or data structures for implementing one or more of the techniques described herein.

Audio decoder 224 may be configured to retrieve and process coded audio data. For example, audio decoder 224 may be a combination of hardware and software used to implement aspects of audio codec. Audio data may be coded using multi-channel formats such as those developed by Dolby and Digital Theater Systems. Audio data may be coded using a compressed or uncompressed format. Examples of compressed audio formats include MPEG-1, 2 Audio Layers II and III, AC-3, AAC, and Ogg Vorbis. An example of an uncompressed audio format includes pulse-code modulation (PCM) audio format. Audio processor 226 may be configured to retrieve captured audio samples and may process audio data for output to an audio system (not shown). In some examples, audio processor 226 may include a digital to analog converter. An audio system may comprise any of a variety of audio output devices such as headphones, a single-speaker system, a multi-speaker system, or a surround sound system.

Video decoder 228 may be configured to retrieve and process coded video data. For example, video decoder 228 may be a combination of hardware and software used to implement aspects of video codec. In one example, video decoder 228 may be configured to decode video data encode according to any number of video compression standards, such as ITU-T H.261, ISO/IEC MPEG-1 Visual, ITU-T H.262 or ISO/IEC MPEG-2 Visual, ITU-T H.263, ISO/IEC MPEG-4 Visual, ITU-T H.264 (also known as ISO/IEC MPEG-4 AVC), VP8, and High-Efficiency Video Coding (HEVC).

As described above, a device with media playback capabilities may provide a graphical user interface (e.g., an EPG) that enables a user to select content. A graphical user interface may include images and graphics displayed in conjunction with video content (e.g., playback icons overlaid on a video). Graphics processing unit 230 is an example of a dedicated processing unit that may be configured to generate graphical user interfaces, including the graphical user interfaces described herein. That is, graphics processing unit 230 may be configured to receive commands and content data and output pixel data. Graphic processing unit 230 may operate according to a graphics pipeline process (e.g., input assembler, vertex shader, geometry shader, rasterizer, pixel shader, and output merger). Graphics processing unit 230 may include multiple processing cores and may be configured to operate according to OpenGL (Open Graphic Library, managed by the Khronos Group) and/or Direct3D (managed by Microsoft, Inc.).

Display processor 232 may be configured to retrieve and process pixel data for display. For example, display processor 232 may receive pixel data from video decoder 228 and/or graphics processing unit 230 and output data for display. Display processor 232 may be coupled to a display, such display 250 (not shown in FIG. 1) using a standardized communication protocol (e.g., HDMI, DVI, DisplayPort, component video, composite video, and/or VGA). Display 250 may comprise one of a variety of display devices such as a liquid crystal display (LCD), a plasma display, an organic light emitting diode (OLED) display, or another type of display device capable of presenting video data to a user. Display 250 may include a standard definition television, a high definition television or an ultra-resolution display as described above. Further, display 250 may include an integrated display of a portable computing device (e.g., a mobile phone, a laptop, a personal data assistant (PDA), or a tablet device). As described above, in some examples a portable computing device may operate as an I/O device for a stationary computing device.

As described above, traditional electronic program guides (EPGs) may be less than ideal for displaying available content originating from a plurality of diverse sources and further may be less than ideal for ultra-resolution displays. Further, traditional EPGs may be limited in how content may be sorted by a user. For example, a user may be limited to sorting on air television programming by channel and time and may be limited to sorting movies and streaming content by genre and alphabetically. Further, traditional EPGs do not enable users customize how content is sorted or provide dynamic sorting techniques. Computing device 200 may be configured to enable the selection of content by providing one or more of the graphical user interfaces described herein. The graphical user interfaces described herein may be provided to a computing device and/or an I/O device in communication with a computing device. FIGS. 3-10 are conceptual diagrams illustrating examples of graphical user interfaces that may be generated by a computing device in accordance with one or more techniques of this disclosure.

Figure 3:
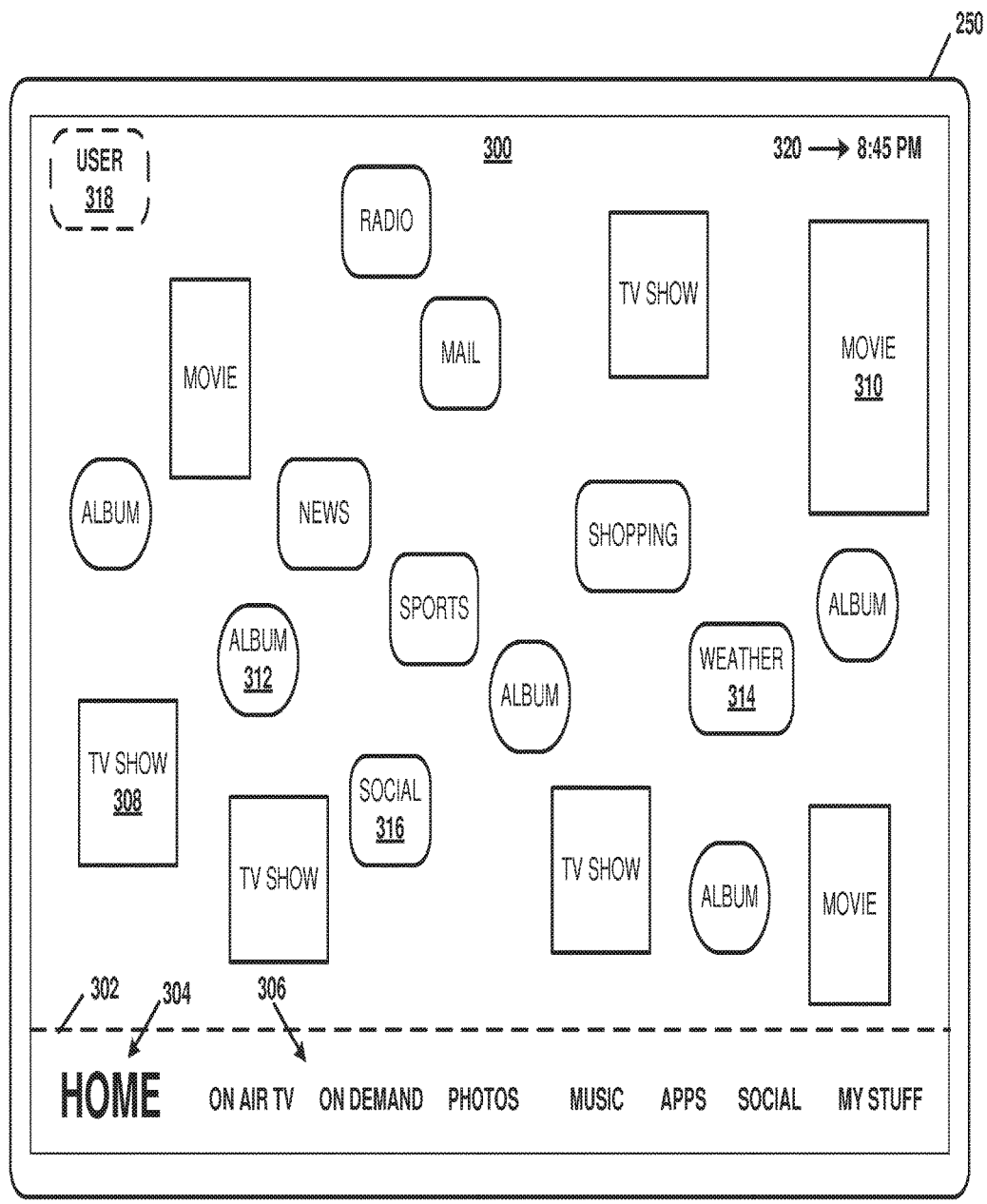
FIG. 3 is a conceptual diagram illustrating an example of a graphical user interface in accordance with one or more techniques of this disclosure.

FIG. 3 is an example of a graphical user interface that may be generated by a computing device to implement one or more techniques of this disclosure. Graphical user interface 300 represents an example of a graphical user interface that may enable a user to select content. In one example, graphical user interface 300 may be a graphical user interface that is initially displayed during operation of a device with media playback capabilities. For example, graphical user interface 300 may be initially presented to a user when a user opens a playback application or selects a user profile. In the example where graphical user interface 300 is presented to a user after a user selects a user profile, graphical user interface 300 may be personalized to a specific user. As described above, in one example, graphical user interface 300 may be presented to a user upon activation of guide button 285. Techniques for personalizing a graphical user interface to a specific user are described in further detail below.

As illustrated in FIG. 3, graphical user interface 300 includes menu bar 302 and a plurality of icons. Menu bar 302 includes a plurality of navigational items 304 and navigational items 306 where one of the navigational items is selected and other navigational items are available for selection. In the example illustrated in FIG. 3, the HOME navigation item is the selected navigational item 304. As illustrated in FIG. 3, the HOME navigational item appears larger than navigational items ON AIR TV, ON DEMAND. PHOTOS, MUSIC, APPS. SOCIAL, and MY STUFF which indicates that it is the selected navigational item.

Navigational items HOME, ON AIR TV, ON DEMAND, PHOTOS, MUSIC, APPS, SOCIAL, and MY STUFF represent different sources, types, and/or categories of content. As described in detail below, different graphical user interfaces may be presented to a user based on the navigational item that is selected. In the example illustrated in FIG. 3, content associated with ON AIR TV navigational item includes television content that is currently scheduled to air (e.g., on air feeds described above with respect to FIG. 1), content associated with ON DEMAND navigational item includes on demand content that may be available through a media service provider and/or a television service provider site, content associated with PHOTOS navigational item includes content associate with a photo collection, content associated with MUSIC navigational item includes content associated with a music collection, content associated with APPS navigational item includes applications available to a user, content associated with SOCIAL navigational item includes social media applications available to a user, and content associated with MY STUFF navigational item includes content originating from diverse sources and may be personalized according to a user. Content associated with ON AIR TV navigational item is described in greater detail below with respect to FIGS. 4A-4D and FIG. 5. Content associated with MY STUFF navigational item is described in greater detail below with respect to FIG. 6. Content associated with ON DEMAND navigational item is described in greater detail below with respect to FIGS. 7-10.

In the example illustrated in FIG. 3, HOME navigational item is selected and corresponding graphical user interface 300 is presented. Each of icon 308, icon 310, icon 312, icon 314, and icon 316 represent different types of content. Icon 318 may identify a user whose profile is currently selected. Icon 320 may identify the current time. It should be noted that in some examples, icon 318 and icon 320 may not be displayed or may be initially displayed and may disappear after a predetermined amount of time. Each of icon 308, icon 310, icon 312, icon 314, and icon 316 may include an image representing content (e.g., a movie poster or a logo). In one example, icons may have an aspect ratio based on content type. For example, standard definition content may be represented by icons with a 4×3 aspect ratio and high definition content may be represented by icons with a 16×9 aspect ratio. Further, in one example, icons may be square or may have a 3×4 aspect ratio (e.g., movie poster icon). Icon 308 represents a television show available for viewing. Icon 310 represents a movie available for viewing. Icon 312 represents a musical album available for listening. Television shows represented by icon 308, movies represented by icon 310, and musical albums represented by icon 312 may respectively include television shows, movies, and albums available through a television provider and/or a media service provider. Further, television shows represented by icon 308, movies represented by icon 310, and musical albums represented by icon 312 may respectively include television shows, movies, and albums stored locally on a computing device.

In one example, individual television shows represented by icon 308, individual movies represented by icon 310, and individual musical albums represented by icon 312 may be presented to a user based on an algorithm that determines the likelihood a user will select a particular piece of content. For example, computing device 200 may be configured to present individual pieces of content based on any and all combinations of consumption, behavior, and environment. In one example, consumption may include content a user has accessed or is accessing. In one example, behavior may include user usage information such as, for example, how fast the user changes channels, how often the user skips commercials, how frequently a user accesses content through a computing device. In one example, environment may include time (e.g., hour, day, month, or year) and location (e.g., home, car, or airport) of a computing device. For example, an algorithm may determine that a user prefers to watch crime dramas on Friday nights and graphical user interface 300 may present an icon representing a crime drama television show at a center position and/or the icon may be larger than other icons. Further, in one example graphical user interface 300 may incorporate 3D effects such that icons appear to be positioned in the foreground or the background based on the likelihood of selection.

As described above, applications may include games and programs operable on a computing device. As further described above, applications may be configured to allow a computing device to access content provided by a site in manner specific to the computing device. Referring again to FIG. 3, icon 314 and icon 316 represent applications. In the example illustrated in FIG. 3, icon 314 represents any type of application and icon 316 represents a social media application. Icons representing applications may be distinguished into types based on how often a user accesses a particular type of application. For example, a user may access social network applications more frequently than a user accesses a banking service or a news application. Thus, social network applications may be represented by distinct icons. In one example, a social media application may allow a user of a computing device, such as a set top box to access a social media service. In a manner similar to that described above with respect to television shows, movies, musical albums, icons representing applications may be presented to a user in a manner based the likelihood a user will select a particular application.

In the example illustrated in FIG. 3, each of icons 308, icon 310, icon 312, icon 314, and icon 316 may be presented in an animated state. For example, each of icons 308, icon 310, icon 312, icon 314, and icon 316 may appear as though they are floating. In one example, each of icons 308, icon 310, icon 312, icon 314, and icon 316 may appear as though they are floating in different planes such that one icon may move "over" and "cover" another icon. Further, motion associated with icons may be based on a likelihood that a user will select a particular icon. For example, icons may move from an initial position to a center position or from a background to a foreground position based on user behavior and/or an algorithm that predicts a particular item of content is more likely to be selected by a user. Movement may be based on one or more of consumption, behavior, and environment described above.

In one example, graphical user interface 300 may display content recommendations by displaying information window or a preview window (not shown in FIG. 3) at a center position. Examples of information windows and preview windows are described in detail below with respect to FIG. 9 and FIG. 10. In one example, a preview window may to continue to cycle through usage based recommendations without requiring user input until a piece of content is selected. That is, for each recommendation, a window displaying a preview video of a short duration associated with the content may be displayed before displaying the next suggestion. In one example, activation of one or more of enter button 262, play button 272, and select button 282, while a preview window is displayed may cause content associated with a preview to be selected. In one example, upon selection of content, content may be displayed in a full screen viewing mode.

Further, in one example, a computing device may be configured to enable a user to select one of the plurality of icons using an I/O device. As described above, an I/O device may include a push-button remote control, a motion based remote control, a device including a touch-sensitive screen, a device including a track pad, a mouse, a keyboard, a microphone, video camera, a motion sensor, and/or an advanced user input device, such as a smart phone or a tablet computing device. For example, a user of computing device 200 may be able to select an icon using I/O device 222. Graphical user interface 300 may be configured such that each icon is capable of multiple levels of selection. For example, a user may be able to use an I/O device to move a cursor, where a cursor may be a visible or invisible cursor, to the location of an icon and remaining on the icon for a predetermined amount of time may be associated with one level of selection and activation of one or more controls on an I/O device (e.g., a single tap or a double tap on a touch-sensitive display) may be associated with other levels of selection (e.g., display information or provide a preview).

In one example, graphical user interface 300 may be configured to enable four levels of selection for each icon: a level that enlarges or highlights an icon, a level that provides information associated with content (e.g., cast and crew information), a level that provides a preview of content associated with an icon (e.g., a trailer), and a level that provides full access to content associated with an icon (e.g., play movie or television show or launch an application). These levels of selection are described in further detail below with respect to FIGS. 8-10. In this manner, graphical user interface 300 enables a user to select content available from a plurality of diverse sources.

In addition to enabling the user to select icons, graphical user interface 300 may enable a user to select one of navigational items 306. In one example, a user may be able to select one of ON AIR TV, ON DEMAND, PHOTOS, MUSIC, APPS, SOCIAL, and MY STUFF by moving a cursor to a corresponding location and/or by activating another navigational button on an I/O device. As described above, activation of one or more of "+" and "−" channel buttons 264, reverse playback button 271 and forward playback button 273, and navigational arrow buttons 281 may cause a selected navigational item 304 to change. In one example, a user may initially select one of navigational items 306 using navigational arrow buttons 281 and may further select an initially selected navigational item 306 by activating select button 282. In one example, upon activation of the select button 282, a graphical user interface other than graphical user interface 300 may be presented (e.g., graphical user interface 400 if ON AIR TV is selected) and menu bar 302 may become inactive. In one example, when menu bar 302 becomes inactive a user may not be able to change a selected navigational item using navigational arrow buttons 281, as navigational arrows buttons 281 may be used to navigate a respective graphical user interface. A user may need to reactive menu bar 302 before navigational arrow buttons 281 may be used to select a navigation item 306. In one example, menu bar 302 may be reactivated upon a user activating back button 286.

As described above with respect to FIG. 2B. I/O device 222 may include stack navigational buttons 292. In one example, a single activation of one of stack navigation buttons 292 may cause a navigational item 306 to become a selected navigation item 304. For example, in the case where ON AIR TV is the selected navigation item 304, activation of left stack navigational button may cause HOME to become selected and activation of right stack navigational button may cause ON DEMAND to become selected. In one example, activation of stack navigational buttons 292 may cause a navigational item to change regardless of the graphical user interface and/or content currently being presented to a user. In this manner, stack navigation buttons 292 may enable a user to change a selected navigation item without going/reversing through a sequence of graphical user interfaces.

FIG. 4A-4D are conceptual diagrams illustrating examples of graphical user interfaces in accordance with one or more techniques of this disclosure. Graphical user interface 400) is an example of a graphical user interface that may be provided by a computing device to implement one or more techniques of this disclosure. In one example, graphical user interface 400 may be a graphical user interface that is displayed when the selected navigational item 304 is ON AIR TV. As described above, content associated with ON AIR TV navigational item includes television content that is currently scheduled to air. It should be noted that although menu bar 302 is included as being displayed in FIG. 4A, in some examples menu bar 302 may be hidden and inactive and may appear and become active based on a user action (e.g., a user moving a cursor towards the bottom of a display, and/or activating back button 286).

As illustrated in FIG. 4A-4D, when ON AIR TV is the selected navigational item 304, a plurality of icons representing television shows are displayed. Each of the plurality of icons representing television shows may be similar to icon 308 described above and in one example may include an image representing a television show. As illustrated in FIGS. 4A-4D, the plurality of icons included in graphical user interface 400 are organized into stack structure 402 and stack structure 404. Each of stack structure 402 and stack structure 404 may represent sub-categories of content associated with navigational item ON AIR TV. In the example illustrated in FIG. 4A, stack structures are organized based on time sub-categories where stack structure 402 includes icons representing on-air television shows that are currently available for viewing (e.g., currently airing or being broadcast by a television network) and stack structure 404 includes icons representing on-air television programs that become available for viewing at 9:00 PM.

It should be noted that although only television shows are displayed in the examples of FIG. 4A-4D, icons may also represent sporting events, movies, and other programming available from a particular television network. The position of icons within a stack structure may be based on an algorithm that determines the likelihood a user will select a particular icon. For example, in a manner similar to the example described above with respect to FIG. 3, if it is Friday night, a crime drama television show may be positioned within a stack structure in a position that facilitates selection by a user (e.g., at a center position).

A computing device may be configured to enable a user to select one of the icons using an I/O device. For example, a user of computing device 200 may be able to select an icon using I/O device 222. Similar to levels of selection available for icons described above with respect to graphical user interface 300, graphic user interface 400 may enable multiple levels of selection for each icon. In the examples illustrated in FIG. 4A-4D, different types of selections may be made available to a user based on whether a particular television show is currently airing. For example, if a particular television show is currently available for viewing, a selection of a corresponding icon by a user may display the television show in progress. If a particular television show is airing at a later time, a selection of a corresponding icon may allow a user to see a preview, set a reminder, and/or schedule the television show for recording.

In addition to enabling a user to select individual icons within stack structure 402 and stack structure 404, graphical user interface 400 may enable a user to select a stack structure. In the example illustrated in FIGS. 4A-4D, stack structure 402 is selected and stack structure 404 represents a stack structure that is available for selecting. In one example, a user may perform a pan right command/gesture using an I/O device and/or press a right arrow button on an I/O device (e.g., right arrow of navigational arrows 281, right stack navigation button 292, and/or play forward button 273) to change the selected stack structure from stack structure 402 to stack structure 404. In the example illustrated in FIG. 4A-4D, selected stack structure 402 is highlighted and made available for additional levels of selection. Examples of additional available levels of selection available for a stack structure are described below with respect to FIGS. 7-10.

Figure 4A:
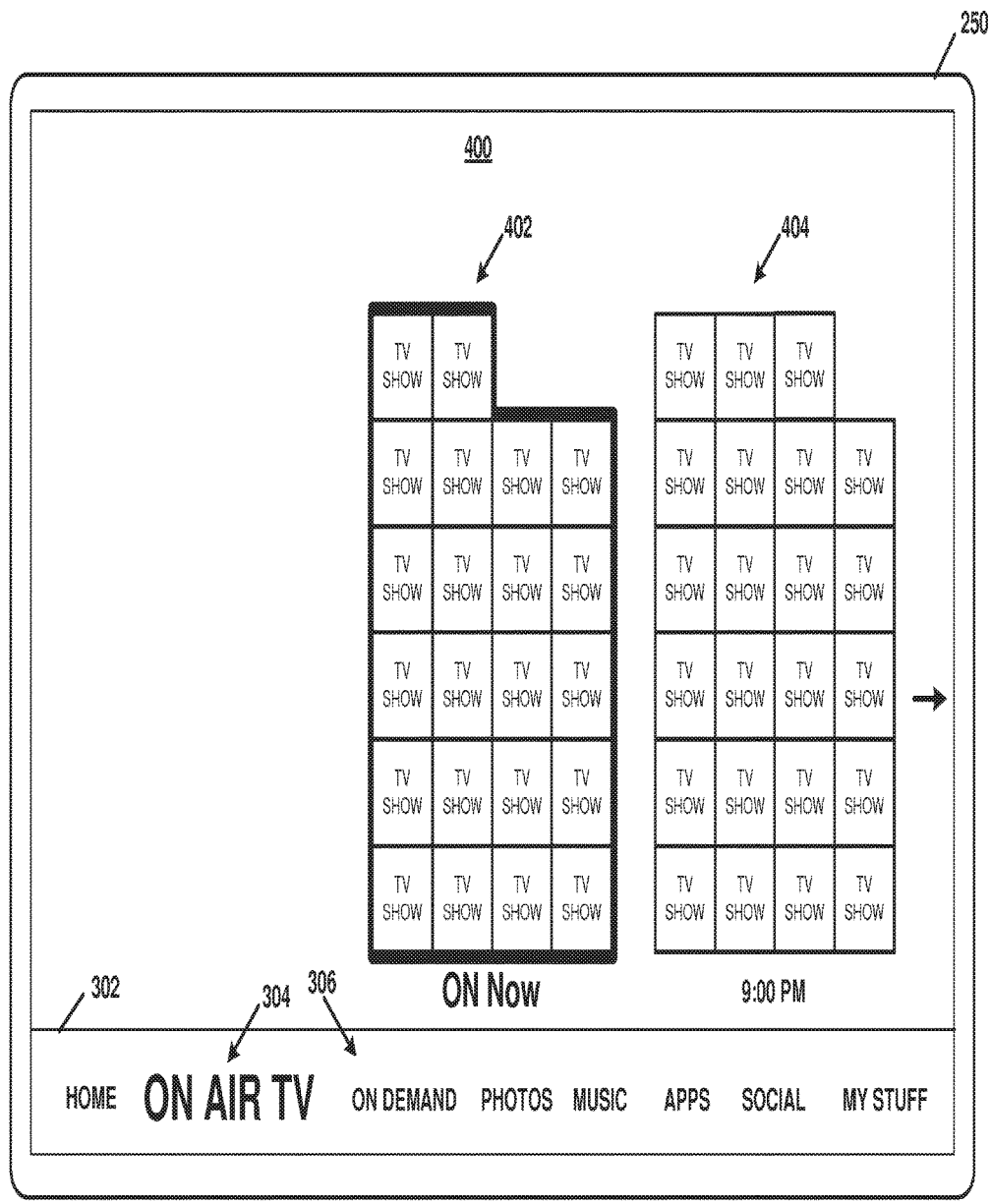
FIG. 4A-4D are conceptual diagrams illustrating examples of a graphical user interface in accordance with one or more techniques of this disclosure.
Figure 5:
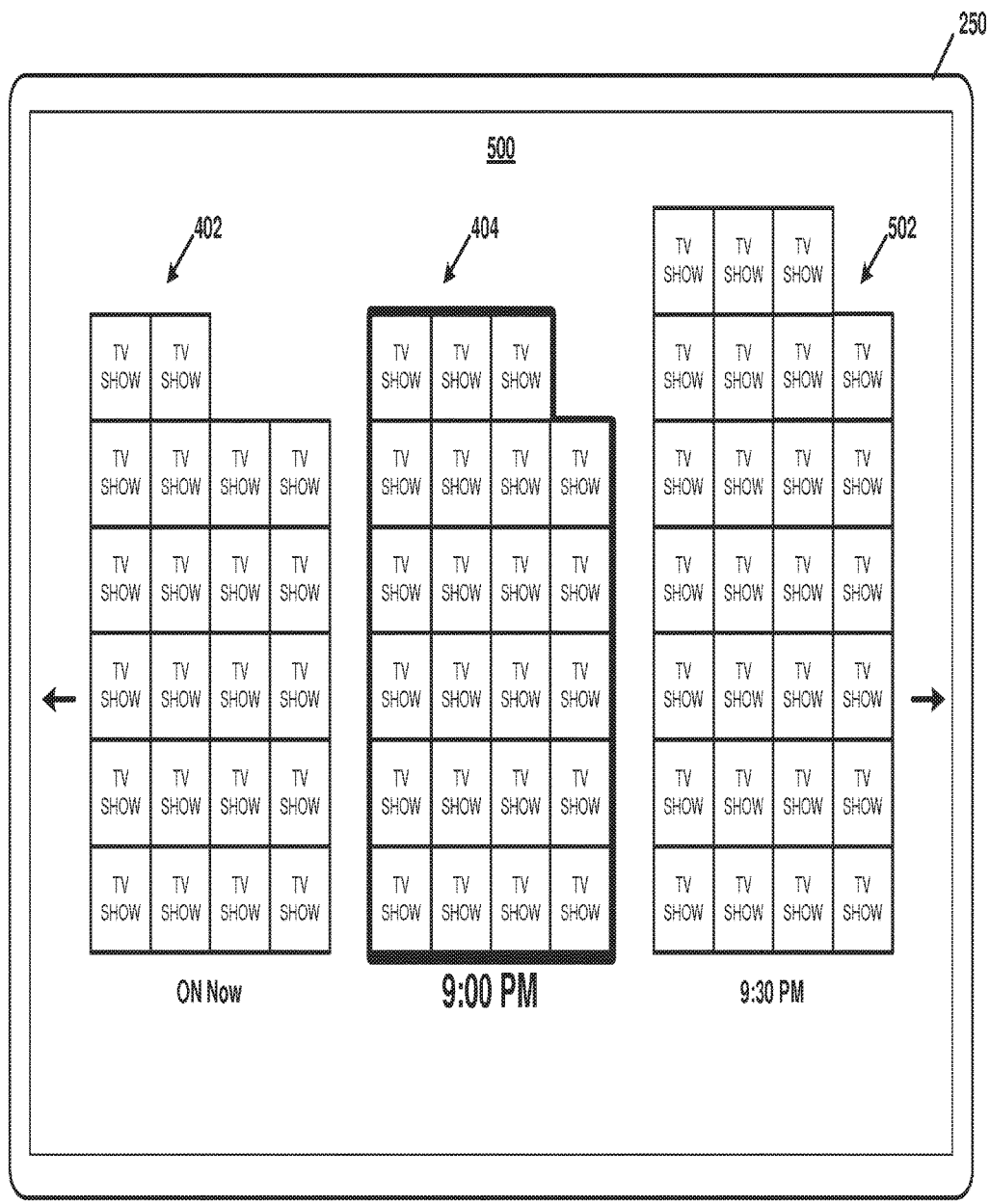
FIG. 5 is a conceptual diagram illustrating an example of a graphical user interface in accordance with one or more techniques of this disclosure.

FIG. 5 is a conceptual diagram illustrating an example of a graphical user interface in accordance with one or more techniques of this disclosure. Graphical user interface 500 is an example of a graphical user interface that may be provided by a computing device to implement one or more techniques of this disclosure. Graphical user interface 500 may be a graphical user interface that is displayed when stack structure 404 illustrated in FIG. 4A is selected. As illustrated in FIG. 5, stack structure 404 is highlighted indicating that it is selected.

As illustrated in FIG. 5, graphical user interface 500 includes stack structure 502 in addition to stack structure 402 and stack structure 404, where stack structure 502 includes icons representing on-air television programs that are available at 9:30 PM. Stack structure 404 is located in graphical user interface 500 at a center position and stack structure 502 is located in graphical user interface 500 at a rightmost position. Thus, stack structure 402 and stack structure 404 effectively move to the left based on a scroll right command from a user. Graphical user interface 500 may be configured such that stack structures respectively move to the right and the left based on scroll left and scroll right commands. For example, stack structure 404 and stack structure 502 may move to the left and a new stack structure including icons representing on-air television programs that become available for viewing at 10:00 PM may appear at the rightmost position upon the user initiating a scroll right command. As described above with respect to FIG. 2B, a user may execute scroll left and scroll right commands using one or more of channel buttons 264, reverse playback button 271 and forward playback button 273, navigational arrow buttons 281, and stack navigational arrows 292. In this manner, by subsequently displaying graphical user interface 500 after receiving a pan right command/gesture and/or an activation of a right arrow button on an I/O device when a graphical user interface 400 is displayed, a computing device enables a user to scroll through sub-categories of a content type.

In the examples illustrated in FIG. 4A and FIG. 5, the sequential presentation of graphical user interface 400 and graphical user interface 500 enables a user to browse television programs according to a chronological order. It should be noted that although graphical user interface includes three stack structures where each may include 28 icons, stack structures may be dynamically displayed based on the amount of content for each category as well as the screen real estate availability. For example, more stack structures may be displayed on larger displays. In this manner, graphical user interface 400 and graphical user interface 500 may be displayed by a computing device to enable a user to select content available from a plurality of diverse sources. In other examples, a computing device may present graphical user interfaces that enable a user to browse content according to other sub-categories. For example, sub-categories for content associated with ON AIR TV navigational item may include networks, genres, titles, actors, directors, and/or popularity rankings (e.g., 1-50 in a stack structure and 51-100 in a stack structure).

Figure 4B:
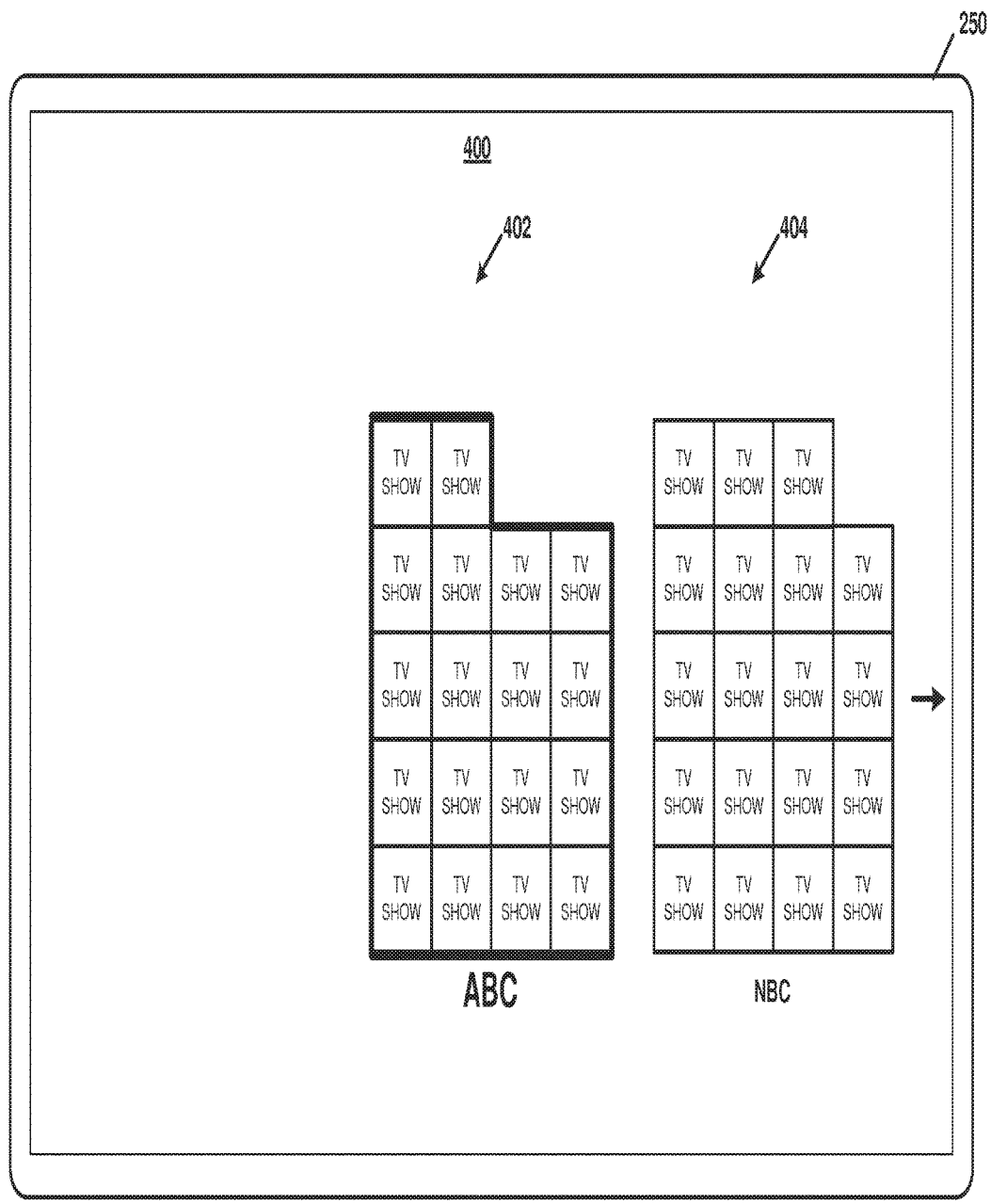
Figure 4C:
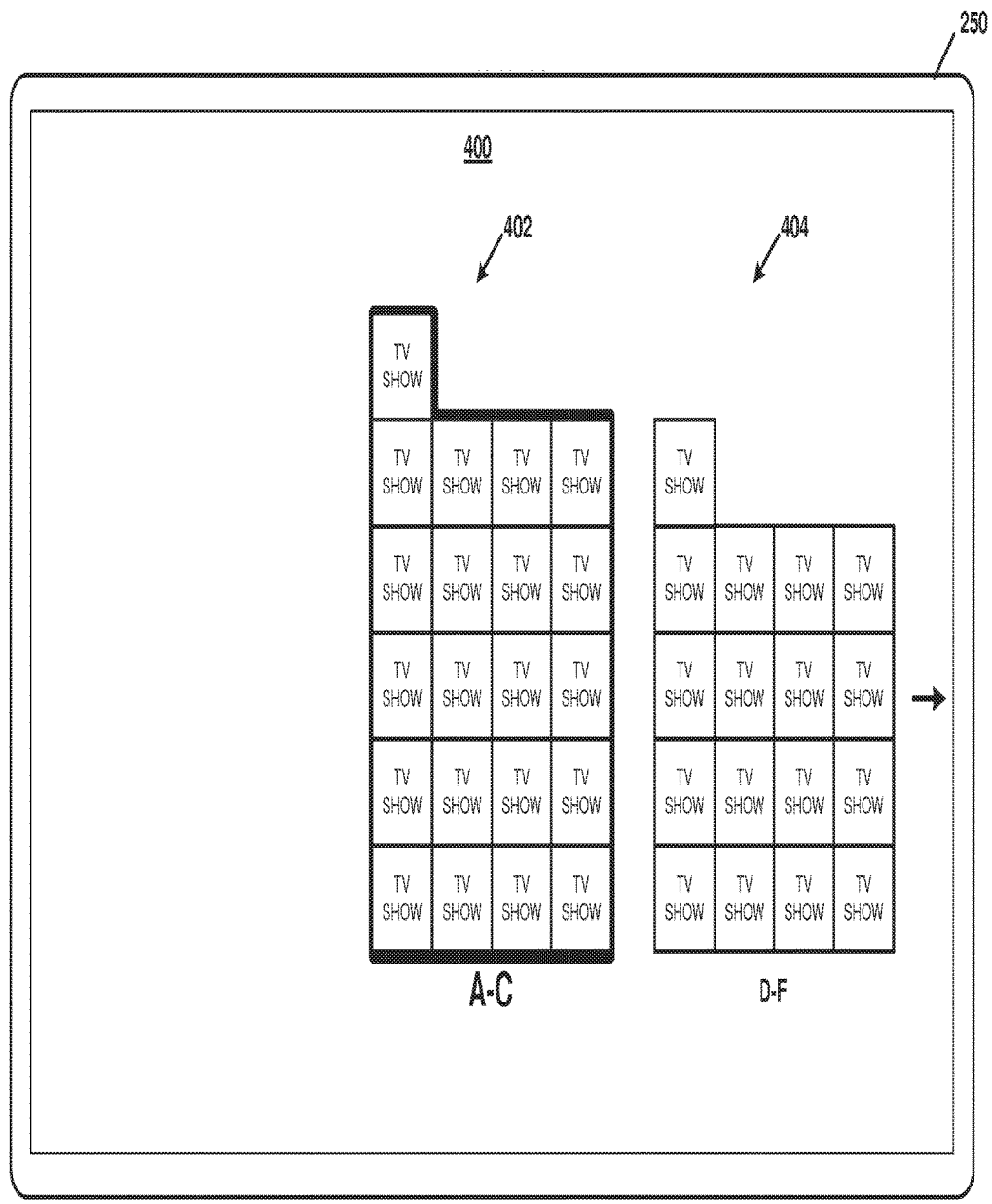
Figure 4D:
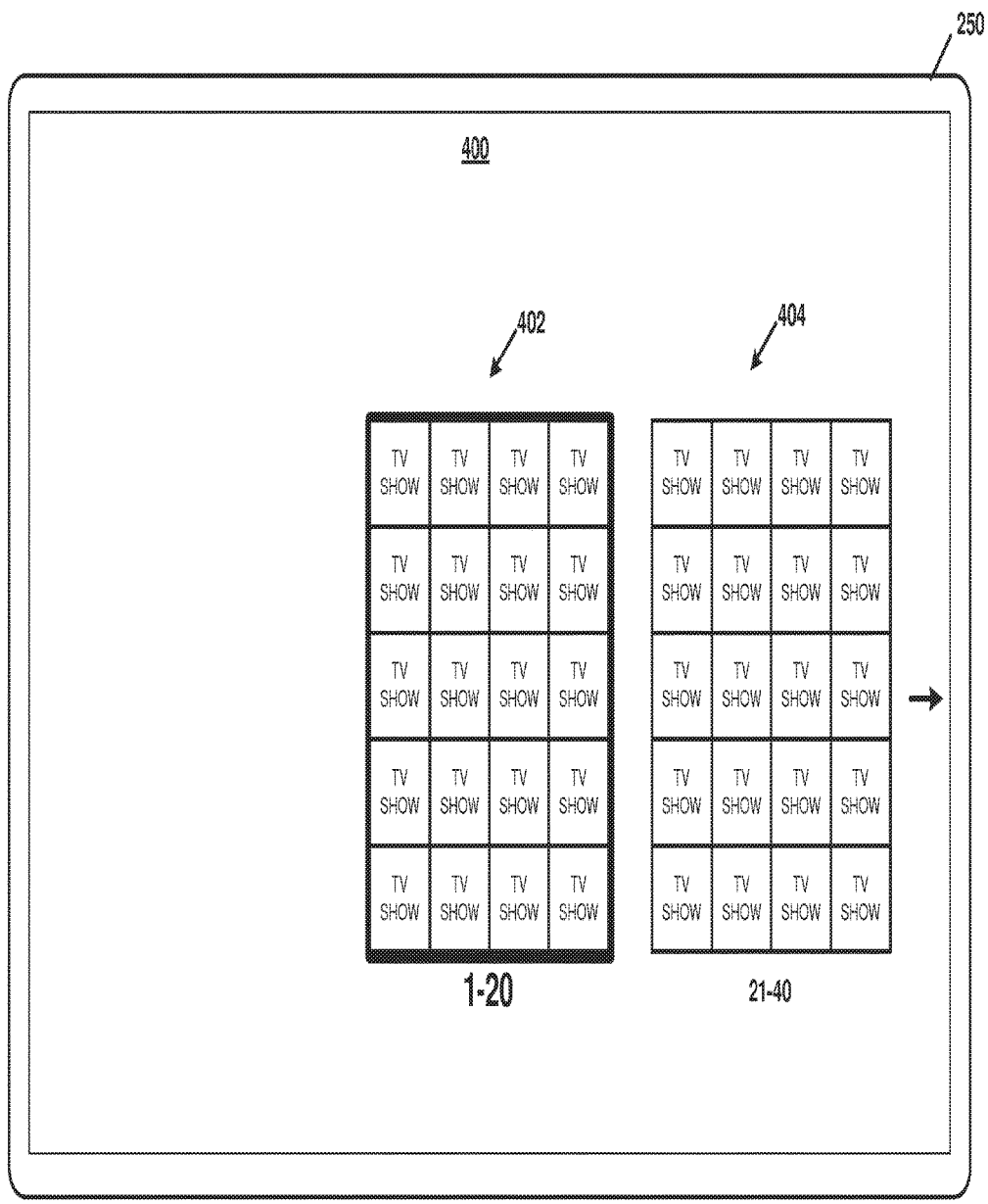

The example graphical user interfaces illustrated in FIG. 4B-4D illustrate graphical user interfaces that enable a user to browse content associated with ON AIR navigation item according to sub-categories other than availability time. In the example illustrated in FIG. 4B stack structures are organized based on network sub-categories and each of the icons within a stack structure are associated with a television network (e.g., ABC, NBC, etc.). In the example illustrated in FIG. 4C stack structures are organized alphabetically based on title sub-categories. In the example illustrated in FIG. 4D, stack structures are organized based on popularity sub-categories. Popularity may be one of most watched now, most popular amongst friends, and most trending show (e.g., greatest change in popularity).

As described above with respect to FIG. 2B, I/O device 222 may include sort button 291. In one example, an activation of sort button 291 may change how stack structure 402 and stack structure 404 are organized into sub-categories. For example, activation of son button 291 may change a sub-categories type (e.g., change from availability time to network). Further, in one example, consecutive activations of sort button 291 may cause a computing device to progress through a sub-category type sort cycle and display respective graphical user interfaces. For example, a user may cycle through organizing stack structures by time, network, alphabetical, and popularity by successive activations of sort button 291 and graphical user interfaces FIGS. 4A-4D may respectively be displayed. That is, stack button 291 enables a user to change a sub-category type. In one example, when a user provides an input indicating a desire to change a sub-category type, a visual transition may occur where stack structures associated with one subcategory type "leave" a display (e.g., disappear into a background) and stack structures associated with another sub-category type "appear" on a display.

It should be noted that although the examples, illustrated in FIGS. 4A-4D illustrate a time, network, alphabetical by title, and popularity son cycle for content associated with ON AIR navigational item, a computing device may be configured to perform other sort cycles. In one example, a sort cycle may be based on one or more of consumption, behavior, and environment described above. For example, a sort cycle may be different for a viewing session occurring on a Friday night compared to a viewing session occurring on a Saturday morning.

In another example, a sort cycle may change based on the frequency of selected a sub-category type. For example, the sub-category type most commonly used by a user for browsing content may be displayed first in a sorting cycle and less frequently used sub-category types may be displayed later in a sorting cycle. In one example, a computing device may analyze metadata associated with content and provide a ranked list of sorting cycles available to the users. For example, with respect to the example sort cycle described with respect to FIGS. 4A-4D, a sort cycle of time, network, alphabetical, and popularity for content associated with ON AIR TV navigational item content may change to a sort cycle network, popularity, time, and alphabetical based on how a user actual sorts content. Further, in one example a computing device may be configured to enable a user to set a sort cycle. For example, a user may wish to only sort based on network and time. In this example, a computing device may present a graphical user interface to a user that the enables a user to set a sort cycle.

In addition to sub-categories types described above with respect to ON AIR TV navigational item, other sub-categories types may be associated with other navigation items. Sub-categories types for content associated with ON DEMAND navigational item may include service providers, genres, titles, actors, directors, and/or popularity rankings. Sub-categories types for content associated with ON DEMAND navigational item are described in greater detail below with respect to FIG. 7. Sub-categories types for content associated with PHOTOS navigational item may include date taken, location, and/or identified individuals. Sub-categories types for content associated with MUSIC navigational item may include artists, genres, release years, and/or popularity rankings. Sub-categories types for content associated with APPS navigational item may include application types (e.g., video, music, photo, social) and popularity rankings. Sub-categories types for content associated with SOCIAL navigational item may include social network types and/or connections. Sub-categories types for content associated with MY STUFF navigational item may be customized by a user and are described in greater detail below with respect to FIG. 6. Further, a user may choose to organize stack structures based on sub-categories types, including but not limited to, content source, alphabetical, recommendations, genres, channels, media device, friend content, and favorites.

In a manner similar to that described above with respect to ON AIR TV navigational item, a computing device may enable a user to change a sub-category type, and thus, how content within a category is organized for content respectively associated with each of ON DEMAND navigational item, PHOTOS navigational item, MUSIC navigational item, APPS navigational item, SOCIAL navigation item, and MY STUFF navigational item. Further, computing device 200 may be configured to enable a user to progress through respective sort cycles for each of the navigational items.

In one example, computing device 200 may be configured to use one or more of the following sort cycles for content associated with the respective navigation items: ON AIR TV: availability time, network, alphabetical by title, most watched now, most popular amongst friends, and/or most trending shows. ON DEMAND: genre and/or sub-genre, alphabetical by title, chronological by release date, and/or popularity. PHOTOS: alphabetically by file name, chronological by date taken, alphabetical by photo album name, geographic location, subject in photo or faces, and/or source of photo. MUSIC: alphabetical by song title, alphabetical by album name, alphabetical by group or artist name, chronologically be release date, genre, popularity, and/or source of music. APPS: Genre, prices, release date, and/or popularity. In a manner similar to that described above, with respect to content associated with ON AIR TV each of these sort cycle may be modified based on one or more of consumption, behavior, environment, and/or may be set by a user. It should be noted that these sort cycle merely typify example sort cycles and each example sort cycle could be personalized further by determining preferred sorting techniques of a user. In this manner, each individual user could have their own sorting preference.

It should be noted that for the sake of brevity graphical user interfaces corresponding to PHOTOS, MUSIC, APPS, and SOCIAL being the selected navigational item are not individual represented in the drawings. However, when one of PHOTOS, MUSIC, APPS, and SOCIAL is a selected navigational item associated content may be organized into stack structures based on any of the sub-categories described above and a user may be able to select stack structures and icons in a manner similar to that described with respect to FIGS. 4A-4D and 5. In one example, a user may be able to choose a sub-category type. For example, a user may be able to choose to browse music content based on genre and corresponding stack structures may be displayed. In other example, sub-categories may be selected based on any and all combinations of consumption, behavior, and environment.

Figure 6:
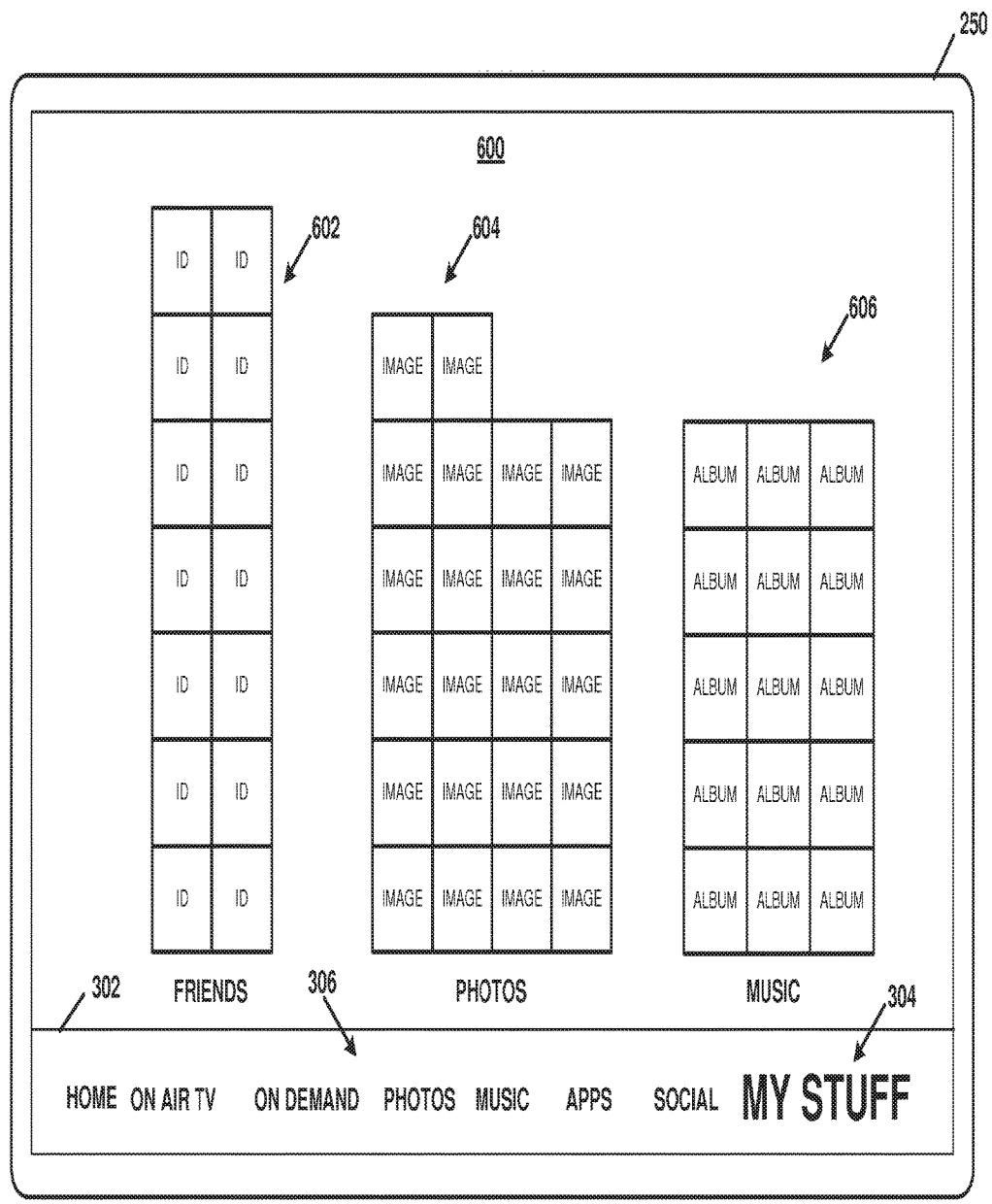
FIG. 6 is a conceptual diagram illustrating an example of a graphical user interface in accordance with one or more techniques of this disclosure.

FIG. 6 is a conceptual diagram illustrating an example of a graphical user interface in accordance with one or more techniques of this disclosure. Graphical user interface 600 is an example of a graphical user interface that may be provided by a computing device to implement one or more techniques of this disclosure. In one example, graphical user interface 600 may be a graphical user interface that is displayed when a selected navigational item 304 is MY STUFF. It should be noted that although menu bar 302 is included as being displayed in FIG. 6, in some examples menu bar 302 may be hidden.

As described above, content associated with MY STUFF navigational item includes content personalized to a user. In the example illustrated in FIG. 6, graphical user interface 600 includes stack structure 602, stack structure 604, and stack structure 606. Stack structure 602 includes icons representing friends of a user, where friends of a user may include individuals connected to a user through one or more social networks. Stack structure 604 includes icons representing photos included in a photo collection of a user. A photo collection may include digital images that are stored locally on a computing device and/or photos that are available through a media sharing site. Stack structure 606 includes icons representing music albums included in a music collection of a user. A music collection may include music that is stored locally on a computing device and/or music that is available through a media sharing site.

Thus, as illustrated in FIG. 6, each of stack structure 602, stack structure 604, and stack structure 606 represent different types of content. That is, stack structure 602 corresponds to social content, stack structure 604 corresponds to photo content, and stack structure 606 corresponds to music content. In one example, a user may configure graphical user interface 600 to select which types of content are included in the stack structures associated with the MY STUFF navigational item. Further, in one example a user may organize icons in a stack structure in a desired manner. For example, a user may place favorite albums at the top of a stack structure. Thus, a computing device configured to display graphical user interface 600 enables a user to select content from diverse sources in a dynamic manner.

As described above, a user of a computing device may be able to select a stack using an I/O device, such as I/O device 222. Examples of additional available levels of selection available for a stack are described below with respect to FIGS. 7-10. FIG. 7 is a conceptual diagram illustrating an example of a graphical user interface in accordance with one or more techniques of this disclosure. In one example, graphical user interface 700 may be a graphical user interface that is displayed when the selected navigational item 304 is ON DEMAND navigational item. As described above, content associated with ON DEMAND navigational item represents on demand content that may be available through a media service provider and/or a television service provider site. It should be noted that although menu bar 302 is included as being displayed in FIG. 7, in some examples menu bar 302 may be hidden.

In the example illustrated in FIG. 7, when ON DEMAND is the selected navigational item 304, a plurality of icons representing movies are displayed. It should be noted that in other examples other type of on demand content may be displayed (e.g., television shows, sporting events, etc.). Each of the plurality of icons representing movies may be similar to icon 310 described above and in one example may include an image representing a movie. In graphical user interface 700 the plurality of icons are organized into stack structure 702, stack structure 704, and stack structure 706. Each of stack structure 702, stack structure 704, and stack structure 706 may represent sub-categories of content associated with navigational item ON DEMAND. In the example illustrated in FIG. 7, stack structure 702 includes icons representing movies with a title beginning with any of the letters A to D, stack structure 704 includes icon representing movies with a title beginning with any of the letters E to F, and stack structure 706 includes icons representing movies with a title beginning with any of the letters (i to L. In this manner, a user may be able to browse on demand movies alphabetically.

The position of icons within a stack may be based on an algorithm that determines the likelihood a user will select a particular icon. For example, recommended movies may be positioned within a stack in a position that facilitates selection by a user (e.g., at a center position). In a manner similar to that described above with respect to FIG. 4 and FIG. 5, a user may use an I/O device to scroll through sub-categories of a content type and corresponding graphical user interfaces may be displayed. For example, a user may perform a pan command/gesture using an I/O device and/or press an arrow button on an I/O device to change the selected stack and titles ranges that are displayed.

In the example illustrated in FIG. 7, stack structure 702 is selected and as such may be made available for additional levels of selection. In one example, a user may activate one or more controls on an I/O device (e.g., a single tap or a double tap on a touch-sensitive display, and/or activation of select button 282) to indicate a further level of selection for stack structure 704. FIG. 8 is a conceptual diagram illustrating an example of a graphical user interface in accordance with one or more techniques of this disclosure. Graphical user interface 800 is an example of a graphical user interface that may be displayed when a user indicates a further level of selection for stack structure 704. As illustrated in FIG. 8, graphical user interface 800 includes selected icon 802, icons available for selection 804, stack menu bar 806, selected stack structure icon 808, and stack structures available for selection 810. It should be noted that in some examples, stack menu bar 806 may be hidden.

In the example illustrated in FIG. 8, each of selected icon 802 and icons available for selection 804 represent individual items of content available for selection within stack structure 704. In this case, movies having a title beginning with the letters E to F. In some examples, the transition from graphical user interface 700 to graphical user interface 800 may occur in an animated fashion. For example, the icons included in stack structure 704 may "tumble" to form graphical user interface 800. For example, stack structure 704 may appear to fall in a clockwise direction and the icon in the lower left corner of stack structure 704 may appear in graphical user interface 800 as selected icon 802. Further, icons included in graphical user interface 800 may be organized in order to further facilitate selection by a user. For example, icons may be organized within stack structure 704 alphabetically and icons may be organized in graphical user interface 800 based on user ratings. As described above content may be organized within a stack structure based on one or more of alphabetical listing, recommendations, favorites, user rating, icons organized in graphical user interface 800 may be reorganized based on or more of alphabetical listing, recommendations, favorites, user rating. Further, it should be noted that icons in graphical user interface 800 may be a different size than icons appearing in graphical user interface 700. For example, icons included in graphical user interface 800 may be larger than icons included in graphical user interface 700. In one example, computing device 200 may be configured to dynamically adjust the size of icons based on properties of a display 250.

Referring again to FIG. 8, example graphical user interface 800 presents the items of content included in stack structure 704 in a manner the further facilitates selections by a user. When presented graphical user interface 800, a user may use an I/O device to change the selected icon and may further select a selected icon. In one example, a user may change the selected icon by moving a cursor (invisible or visible) to a desired icon. In one example, a user may activate one or more controls on an I/O device (e.g., a single tap or a double tap on a touch-sensitive display, and/or activation of select button 282) to indicate a further level of selection. In this manner, graphical user interface 800 may be displayed by a computing device to enable a user to select content.

Figure 9:
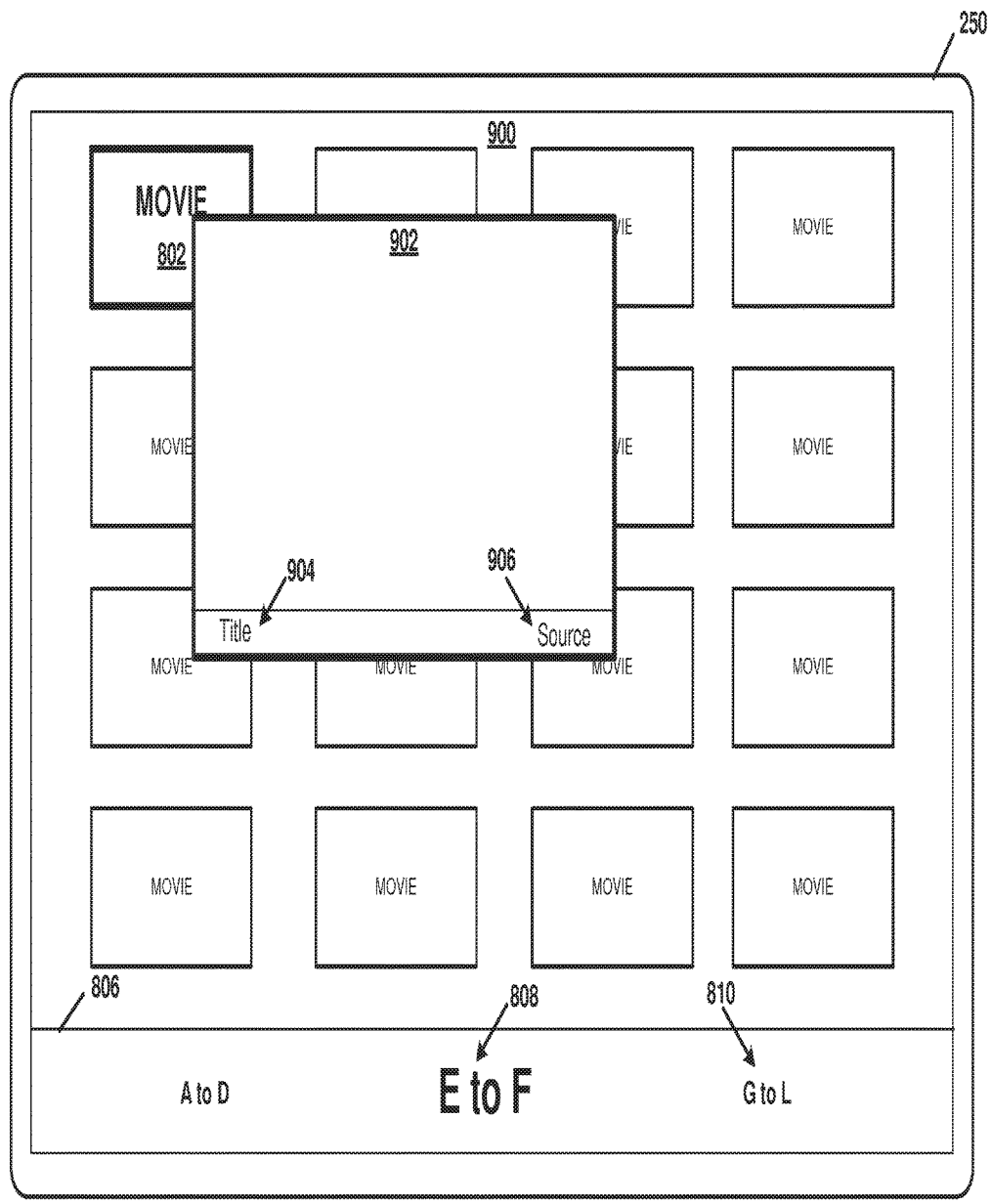
FIG. 9 is a conceptual diagram illustrating an example of a graphical user interface in accordance with one or more techniques of this disclosure.
Figure 10:
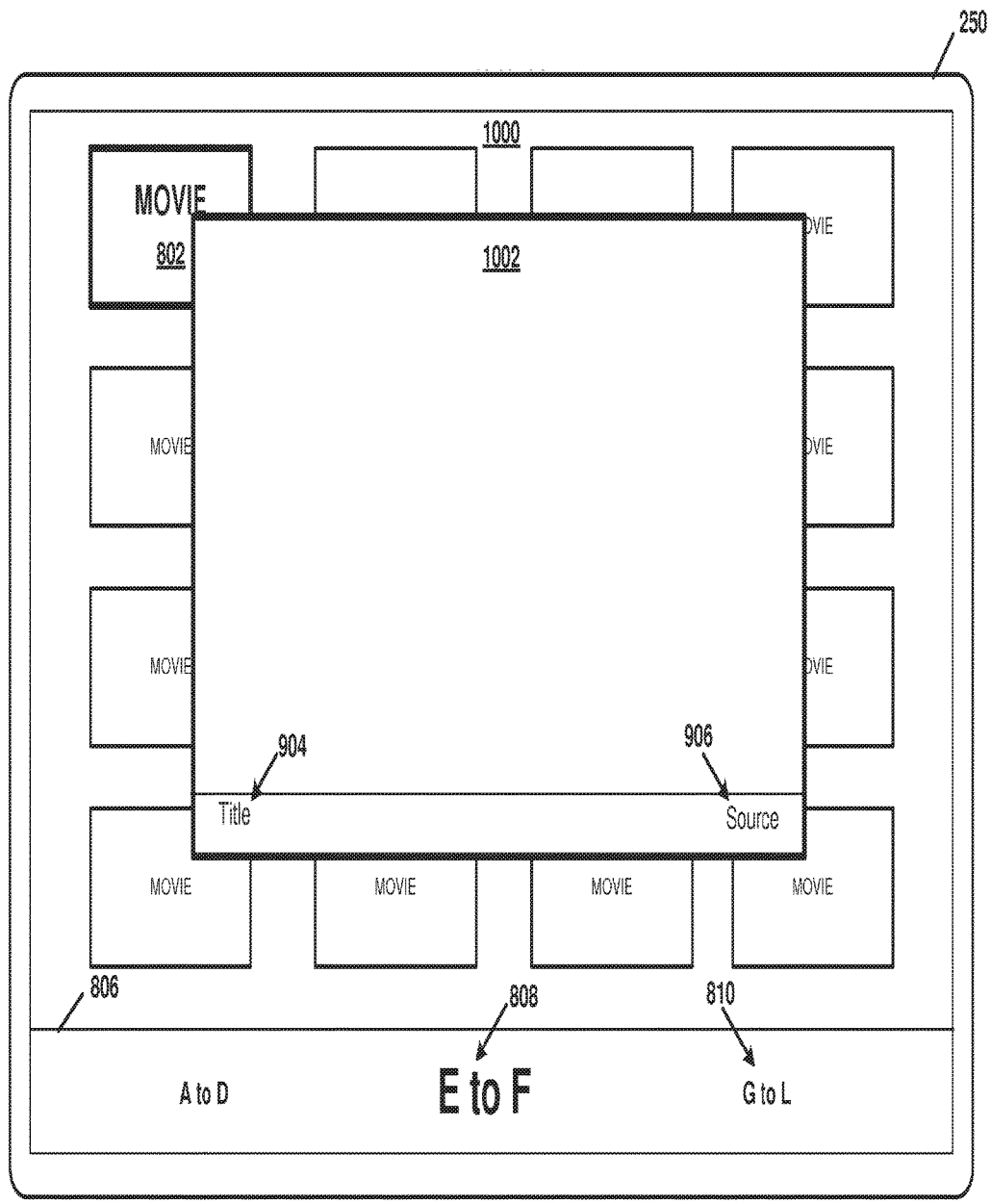
FIG. 10 is a conceptual diagram illustrating an example of a graphical user interface in accordance with one or more techniques of this disclosure.

FIG. 9 and FIG. 10 are conceptual diagrams illustrating examples of a graphical user interfaces in accordance with one or more techniques of this disclosure. Graphical user interface 900 and graphical user interface 1000 are examples of graphical user interfaces that may be provided by a computing device to implement one or more techniques of this disclosure. In one example, graphical user interface 900 may be a graphical user interface that is displayed when icon 802 selected at an additional level and graphical user interface 900 may be a graphical user interface that is displayed when icon 802 selected at a further additional level. As illustrated in FIG. 9, graphical user interface 900 includes information window 902 in addition to selected icon 802, icons available for selection 804, stack menu bar 806, selected stack icon 808, stacks available for selection 810. As illustrated in FIG. 10, graphical user interface 1000 includes preview window 1002 in addition to selected icon 802, icons available for selection 804, stack menu bar 806, selected stack icon 808, stacks available for selection 810.

As illustrated in FIGS. 9 and 10, information window 902 and preview window 1002 include title identifier 904 and source 906. Title identifier 904 may identify the title of an item of content (e.g., the title of a movie). Source identifier 906 may identify a source of the content. For example, source identifier 906 may identify a media service provider or a television network. Further, in the example where on demand content is Pay Per View content available from a television service provider, source identifier 906 may include a price to view the content. Information window 902 and preview window 1002 may be distinct in that information window 902 simply provides a high resolution image of an item of content and preview window 1002 provides a video preview of an item of content. Further, distinct additional levels of selection may be associated with information window 902 and preview window 1002. For example, cast and crew information may be accessible by a user when information window 902 is displayed and the option to view content in a full screen mode may be available when preview window 1002 is displayed. In other examples, an additional selection of selected icon 802 may provide a preview window 1002 without providing an information window. In this manner, each of graphical user interface 900 and graphical user interface 1000 may be displayed by a computing device to enable a user to select content.

Figure 11:
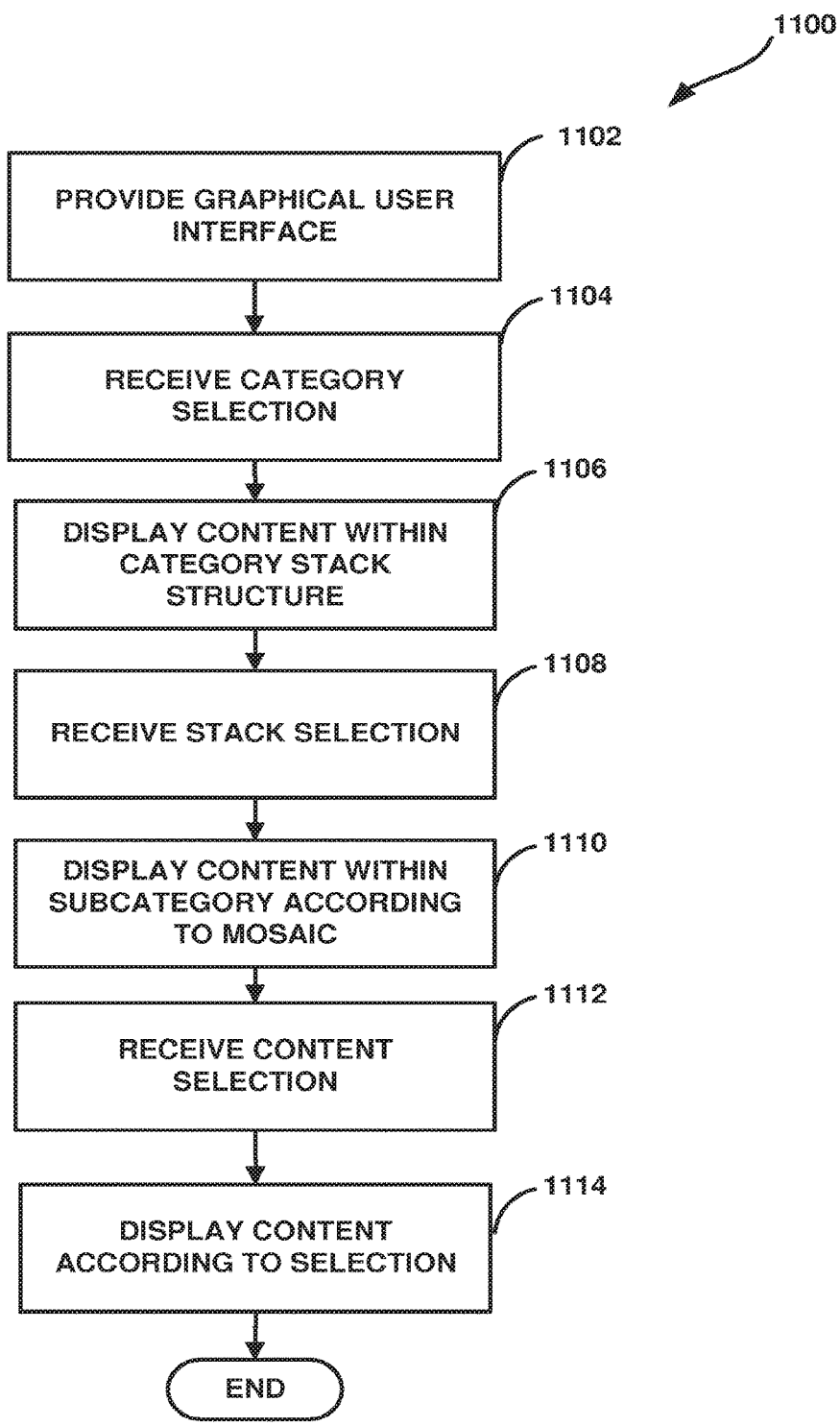
FIG. 11 is a flowchart illustrating an example method for enabling selection of content according to the techniques of this disclosure.

It should be noted that a computing device may display any and all combinations of the graphical user interfaces illustrated in FIGS. 3-10 and the example descriptions of how graphical user interfaces may be presented to a user are for illustrative purposes. FIG. 11 is a flowchart illustrating an example method for enabling selection of content input according to the techniques of this disclosure.

Flowchart 1100 illustrates an example of how graphical user interfaces described herein may be presented to a user. It should be noted that although flowchart 1100 is described with respect to computing device 200, the techniques described with respect to flowchart 1100 may be performed by any and all combinations of components of computing device 200. Computing device 200 provides an initial graphical user interface to a user (1102). In one example, an initial graphical user interface may include graphical user interface 300 and may be presented to a user after a user logs-in to a profile and/or upon a user activation guide button 285. Computing device 200 receives a category selection (1104). In one example, computing device 200 may receive a category selection from an I/O device and a user may indicate a category selection by selection of a navigational item included in a menu bar. In one example, a user may select a navigational item using stack structure navigational buttons 292. Computing device 200 displays content within a category according to sub-category stack structures (1106). For example, computing device 200 may respectively display one of graphical user interface 400, graphical user interface 500, graphical user interface 600, and graphical user interface 700. As described above, a user may be able to organize content associated with graphical user interface 400, graphical user interface 500, graphical user interface 600, and graphical user interface 700 by changing a sub-category type. In one example, computing device 200 may enable a user to progress through a sort cycle by successively activating sort button 291.

Computing device 200 receives a stack structure selection (1108). In one example, computing device 200 may receive a stack structure selection from I/O device 222 and a user may indicate a stack structure selection by highlighting a stack structure with a cursor and activating an I/O device control. In the example illustrated in flowchart 1100, computing device 200 displays content within a sub-category according to a mosaic. In one example, computing device 200 may display graphical user interface 800. Computing device 200 receives a user content selection (1112). In one example, computing device 200 may receive a user content selection according to the techniques described above with respect to FIGS. 8-10. Computing device 200 displays content according to a user selection (1114). In one example, computing device 200 may display an information window, a preview window, or play multimedia in a full screen mode or launch an application. In this manner, computing device 200 represents an example of a device configured enable selection of content.

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, which is generated to encode information for transmission to suitable receiver apparatus.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a mark-up language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A method comprising:
   causing, by one or more processors of a machine, a display, on a display device, of a first graphical interface that simultaneously presents a plurality of container structures, each container structure of the plurality of container structures corresponding to one of a plurality of sub-categories within a category of content, a container structure of the plurality of container structures including one or more icons, each icon of the one or more icons representing a content item within a first sub-category of the plurality of sub-categories within the category of content;
   receiving, from a device, input indicative of a first selection of the container structure; and
   in response to receiving the user input, causing a display, on the display device, of a second graphical interface that presents the one or more icons of the container structure for a second selection, the causing of the display of the second graphical interface including changing a manner in which the one or more icons of the container structure are organized within the container structure.

2. The method of claim 1, wherein the causing display of the second graphical interface further includes causing display of an animated transition between the first and second graphical interface.

3. The method of claim 1, wherein the causing display of the second graphical interface further includes presenting at least one of the one or more icons at a different size in the second graphical interface than in the first graphical interface.

4. The method of claim 1, further comprising:
   receiving, from the device, user input indicative of a selection of an icon; and
   in response to receiving the user input, causing presentation, on the display of the computing device, of a content item corresponding to the first icon.

5. The method of claim 1, wherein the first graphical interface is displayed in response to an activation of a navigation button of the device.

6. The method of claim 5, wherein:
   the category of content is a first category of content,
   the method further comprises:
      in response to a second activation of the navigation button of the device, causing display, on the display of the computing device, of a third graphical user interface that includes one or more container structures that correspond to a second category of content.

7. The method of claim 1, further comprising updating the display of the second graphical interface based on activation of a navigation button of the device, the updating of the display of the second graphical user interface including displaying at least one icon of a second container structure corresponding to a second sub-category of the plurality of sub-categories.

8. The method of claim 1, wherein the category of content is selected from the group comprising: on-air television content, on demand content, multimedia content, image content, and user applications.

9. The method of claim 1, wherein:
   the one or more icons of the container structure are organized in the first graphical interface according to a chronological order; and
   the one or more icons of the container structure are organized in the second graphical interface according to geographic location.

10. The method of claim 1, wherein:
    the category of content corresponds to photos; and
    the plurality of sub-categories within the category of content includes at least one of: a plurality of times associated with content items or a plurality of geographic locations associated with content items.

11. The method of claim 1, wherein:
    the plurality of sub-categories within the category of content correspond to a first sub-category type;
    the method further comprises enabling a user to change the first sub-category type to a second sub-category type.

12. A system comprising:
    one or more processors; and
    a memory accessible to the one or more processors, the memory storing instructions which, upon execution by the one or more processors, causes the one or more processors to perform operations comprising:
       causing a display, on a display device, of a first graphical interface that simultaneously presents a plurality of container structures, each container structure of the plurality of container structures corresponding to one of a plurality of sub-categories within a category of content, a container structure of the plurality of container structures including one or more icons, each icon of the one or more icons representing a content item within a first sub-category of the plurality of sub-categories within the category of content;
       receiving, from a device, input indicative of a first selection of the container structure; and
       in response to receiving the user input, causing a display, on the display device, of a second graphical interface that presents the one or more icons of the container structure for a second selection, the causing of the display of the second graphical interface including changing a manner in which the one or more icons of the container structure are organized within the container structure.

13. The system of claim 12, wherein the causing display of the second graphical interface further includes causing display of an animated transition between the first and second graphical interface.

14. The system of claim 12, wherein the causing display of the second graphical interface further includes presenting at least one of the one or more icons at a different size in the second graphical interface than in the first graphical interface.

15. The system of claim 12, wherein the operations further comprise:
    receiving, from the device, user input indicative of a selection of an icon; and
    in response to receiving the user input, causing presentation, on the display of the computing device, of a content item corresponding to the first icon.

16. The system of claim 12, wherein the first graphical interface is displayed in response to an activation of a navigation button of the device.

17. The system of claim 16, wherein:
    the category of content is a first category of content,
    the method further comprises:
        in response to a second activation of the navigation button of the device, causing display, on the display of the computing device, of a third graphical user interface that includes one or more container structures that correspond to a second category of content.

18. The system of claim 12, further comprising updating the display of the second graphical interface based on activation of a navigation button of the device, the updating of the display of the second graphical user interface including displaying at least one icon of a second container structure corresponding to a second sub-category of the plurality of sub-categories.

19. The system of claim 12, wherein the category of content is selected from the group comprising: on-air television content, on demand content, multimedia content, image content, and user applications.

20. A non-transitory computer-readable storage medium comprising instructions stored thereon that upon execution cause one or more processors of a device to perform operations comprising:
    causing a display, on a display device, of a first graphical interface that simultaneously presents a plurality of container structures, each container structure of the plurality of container structures corresponding to one of a plurality of sub-categories within a category of content, a container structure of the plurality of container structures including one or more icons, each icon of the one or more icons representing a content item within a first sub-category of the plurality of sub-categories within the category of content;
    receiving, from a device, input indicative of a first selection of the container structure, and
    in response to receiving the user input, causing a display, on the display device, of a second graphical interface that presents the one or more icons of the container structure for a second selection, the causing of the display of the second graphical interface including changing a manner in which the one or more icons of the container structure are organized within the container structure.

* * * * *